(12) United States Patent
Wulf et al.

(10) Patent No.: US 12,131,275 B2
(45) Date of Patent: Oct. 29, 2024

(54) SYSTEMS AND METHODS FOR MANAGING ASSIGNMENTS OF TASKS FOR WORK MACHINES USING MACHINE LEARNING

(71) Applicant: Caterpillar Inc., Peoria, IL (US)

(72) Inventors: Stefan J. Wulf, Washington, IL (US); Cameron T. Lane, Oro Valley, AZ (US); Andrew S. Yun, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 216 days.

(21) Appl. No.: 17/936,462

(22) Filed: Sep. 29, 2022

(65) Prior Publication Data

US 2023/0419208 A1    Dec. 28, 2023

Related U.S. Application Data

(60) Provisional application No. 63/355,410, filed on Jun. 24, 2022.

(51) Int. Cl.
*G06Q 10/0631* (2023.01)
*B60W 60/00* (2020.01)
(Continued)

(52) U.S. Cl.
CPC . *G06Q 10/063114* (2013.01); *B60W 60/0025* (2020.02); *E02F 9/2062* (2013.01);
(Continued)

(58) Field of Classification Search
CPC ....... G06Q 10/063114; G06Q 10/0639; B60W 60/0025; B60W 2300/17; B60W 40/10;
(Continued)

(56) References Cited

U.S. PATENT DOCUMENTS 6,741,921 B2    5/2004  Cohen et al.
9,079,505 B1 *  7/2015  Hyde .................... G08G 1/202
(Continued)

FOREIGN PATENT DOCUMENTS

CA          3163063 A1 *  7/2021  ............. E02F 9/261
KR     20220068287 A     5/2022
WO      2017070330 A1    4/2017

OTHER PUBLICATIONS

Written Opinion and International Search Report for Int'l. Patent Appln. No. PCT/US2023/021964, mailed Aug. 31, 2023 (13 pgs).

*Primary Examiner* — Muhammad Shafi

(57) ABSTRACT

Systems and methods are disclosed for managing task assignments for a plurality of work machines at a site. An assignment engine may: receive first state data for a work machine including historical data, operating condition, and location data, and second state data for the site including characteristic data for materials and a plurality of available tasks; predict performance data and energy consumption data of the work machine for a task; select a task for the work machine by inputting first state data and second state data into a trained reinforcement-learning model, wherein: the model has been trained to learn an assignment policy that optimizes a reward function such that the learned policy selects a task for at least one work machine from the plurality of tasks available at the site; and cause the at least one work machine to be operated according to the at least one task assignment.

24 Claims, 9 Drawing Sheets

(51) Int. Cl.
*E02F 9/20* (2006.01)
*E02F 9/26* (2006.01)
*G05B 13/02* (2006.01)
*G06Q 10/0639* (2023.01)
*G07C 5/10* (2006.01)
*B60L 58/12* (2019.01)

(52) U.S. Cl.
CPC ............ *E02F 9/2091* (2013.01); *E02F 9/261* (2013.01); *G05B 13/0265* (2013.01); *G06Q 10/0639* (2013.01); *G07C 5/10* (2013.01); *B60L 58/12* (2019.02); *B60L 2200/40* (2013.01); *B60W 2300/17* (2013.01)

(58) Field of Classification Search
CPC ....... E02F 9/2062; E02F 9/2091; E02F 9/261; E02F 9/205; E02F 9/2054; G05B 13/0265; G07C 5/10; B60L 58/12; B60L 2200/40; B60L 53/63; B60L 58/16; B60L 2240/647; B60L 2250/16; B60L 2260/46; B60L 2260/54

USPC .......................................................... 701/24
See application file for complete search history.

(56) References Cited

U.S. PATENT DOCUMENTS

| | | |
|---|---|---|
| 10,852,707 B2 | 12/2020 | Mountford et al. |
| 11,049,208 B2 | 6/2021 | Petroff |
| 2018/0174377 A1* | 6/2018 | Collins ................... E02F 9/261 |
| 2020/0166928 A1 | 5/2020 | Sudarsan et al. |
| 2020/0257253 A1* | 8/2020 | Yamaguchi ....... G05B 19/41865 |
| 2021/0124359 A1* | 4/2021 | Wei .......................... E02F 3/434 |
| 2021/0125123 A1* | 4/2021 | Subramanian .......... E02F 9/262 |
| 2021/0149403 A1 | 5/2021 | Ready-Campbell et al. |
| 2021/0334720 A1 | 10/2021 | Brockhurst et al. |
| 2021/0380013 A1 | 12/2021 | Moszynski et al. |

* cited by examiner

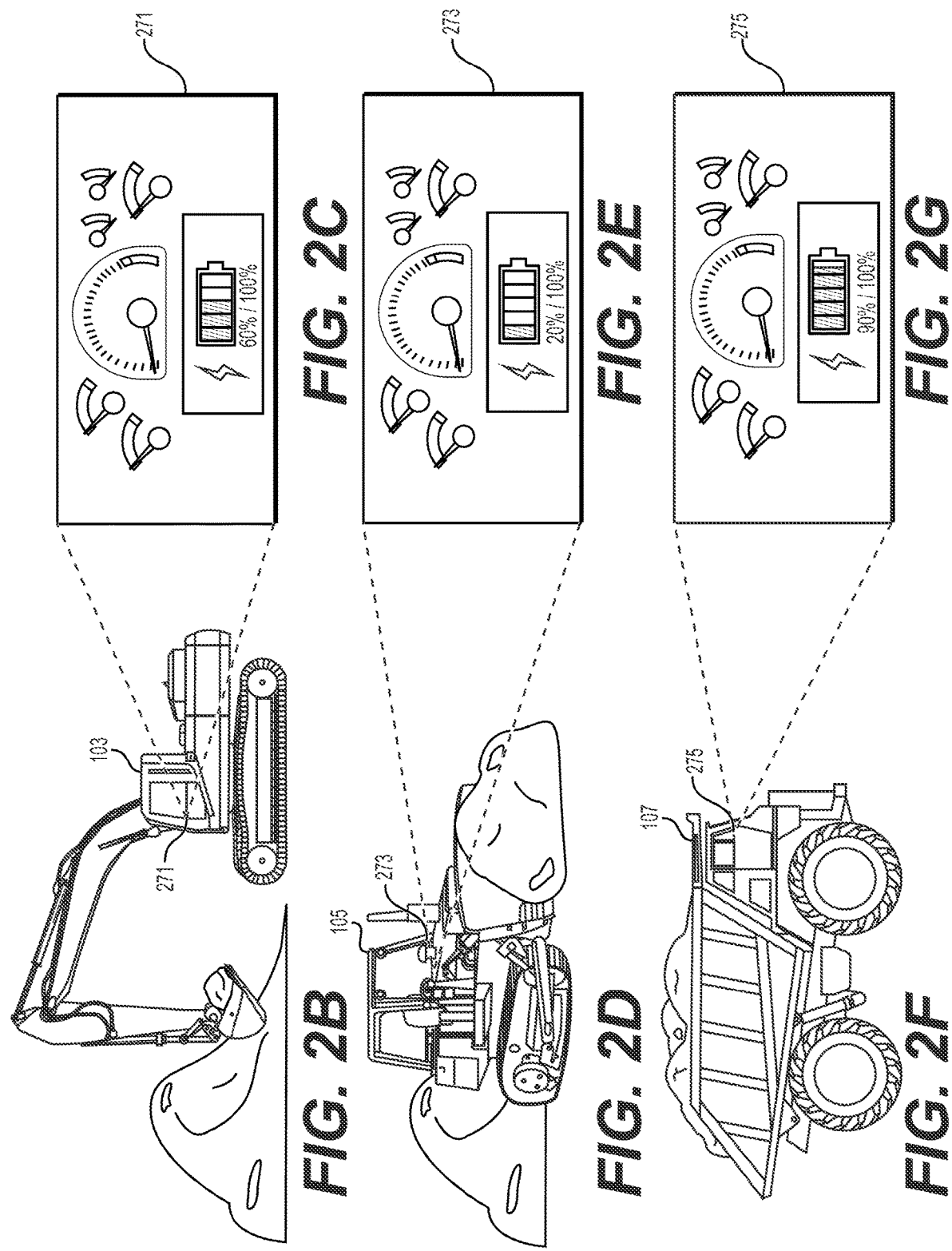

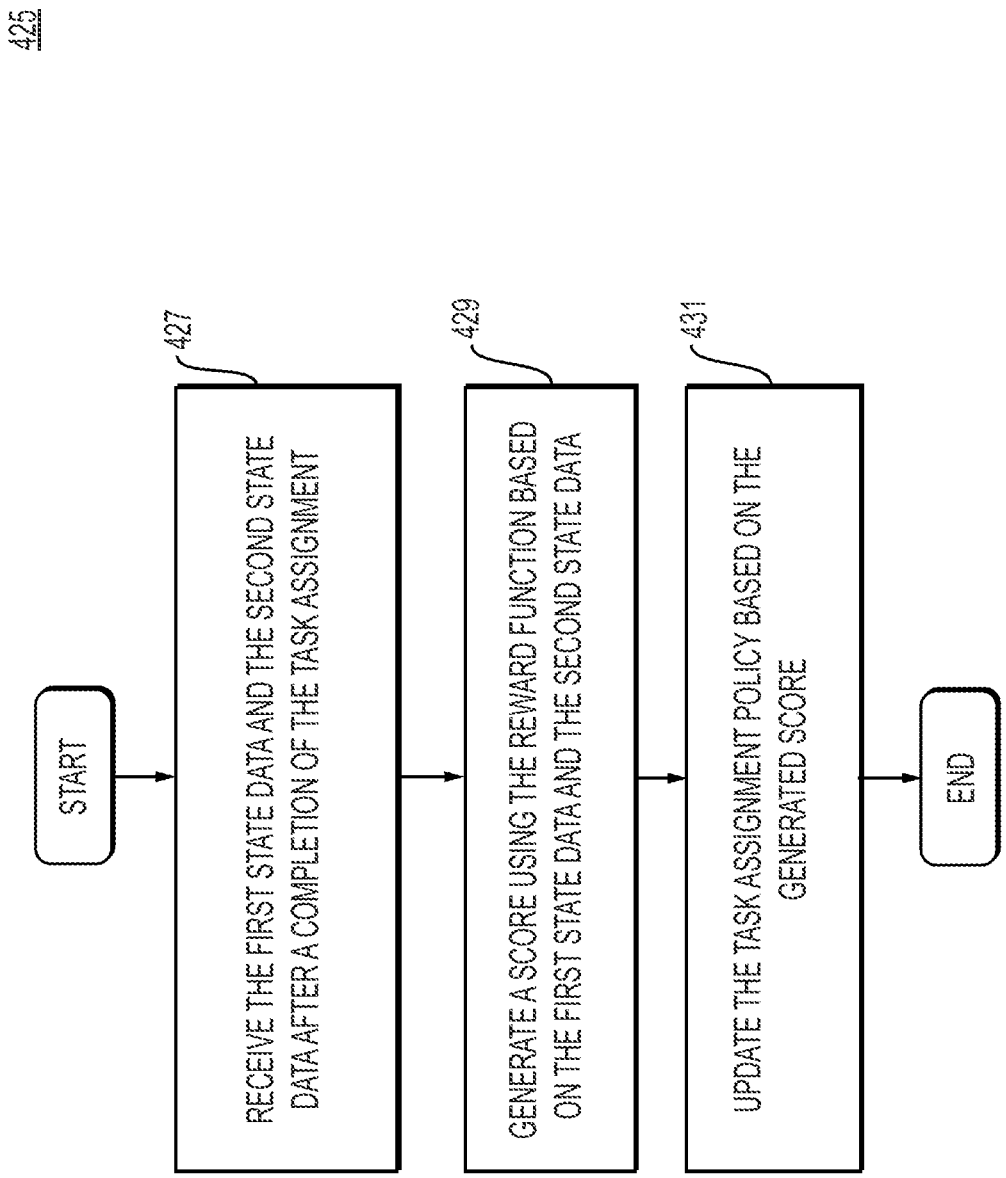

SYSTEMS AND METHODS FOR MANAGING ASSIGNMENTS OF TASKS FOR WORK MACHINES USING MACHINE LEARNING

CROSS-REFERENCE TO RELATED APPLICATIONS

This patent application claims the benefit of priority to U.S. Provisional Patent Application No. 63/355,410, filed on Jun. 24, 2022, the entirety of which is incorporated herein by reference.

TECHNICAL FIELD

This disclosure relates generally to managing assignment of tasks, e.g., of autonomous, semi-autonomous, or manually operated work machines, for various operations. More particularly, this disclosure relates to systems and methods that incorporate machine-learning techniques to manage assignment of tasks to a plurality of work machines, e.g., greenhouse-gas-free machines and/or battery operated electric machines.

BACKGROUND

Construction sites, mining sites, and/or large-scale excavating sites may use guided work machines, e.g., digging, loading, and/or hauling machines, to remove and carry excavated material, e.g., ore or overburden, from an area of excavation to a processing location. Numerous factors may influence the productivity and efficiency of the work machines at such sites including, machine operating conditions (e.g., state-of-charge data, state-of-health data, usage statistics, maintenance data, travel speed data, temperature data, wear and tear on components, payload, tire pressure, etc.), site conditions (e.g., weather, visibility, material composition, terrain contour, route conditions and traffic, ground moisture levels, etc.), skill or experience level of the machine operators. Since efficient assignment of various tasks to these work machines may be complex and computationally intensive, detailed plans are put in place to manage the work machines and the activities on the site.

Large-scale construction, mining, and/or excavating operations desire maximum utilization of work machines to maximize profit. The maximum utilization of work machines requires efficient dispatching of the work machines to the various excavating, loading, and/or unloading stations. A manual dispatch may not be as efficient as an automated dispatch that performs the same function, e.g., a restricted automatic dispatch wherein work machines are dispatched automatically based on restrictions defined by controllers of the site. Commonly owned U.S. Patent 2021/0334720 A1, incorporated herein by reference in its entirety, discloses a further implementation of a restricted automatic dispatch.

While such a restricted automatic dispatch can be used effectively at larger sites, such solutions may require that site controllers are vigilant and continuously manage the restrictions to optimize production. Thus, a more or fully automatic dispatch may be beneficial, e.g., so that site operations may be optimized without the need for continuous intervention by controllers applying rules to the dispatch. Further, technologies for vehicles and site operations are generally moving toward more environmentally-conscious technologies, e.g., greenhouse gas (GHG) free machines or battery-operated electric machines. However, such technologies may present constraints and challenges that may also not be accounted for in conventional solutions. For example, GHG free machines generally have limited energy storage capacity that may limit the operations a machine can complete. GHG free machines generally require more frequent and strategic stoppages to recharge or refuel relative to conventional vehicles.

U.S. Patent Application Publication No. 2020/0166928 A1, published on May 28, 2020 ("the '928 publication"), describes a system and method for improving user safety by assigning tasks to unmanned vehicles based on location-specific risk data. The location-specific risk data indicates an estimated likelihood of a particular event, e.g., events that are difficult or dangerous for users, occurring within a geographic region. The system and method of the '928 publication may not account for unique challenges and complexities that may be present in construction, mining, and/or excavating operations, let alone teach or disclose a method for assigning tasks to the unmanned vehicles based on the operating condition of various components of the unmanned vehicles and characteristic data of the materials in the site.

The techniques of this disclosure may solve one or more of the problems set forth above and/or other problems in the art. The scope of the current disclosure, however, is defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one aspect, a computer-implemented method for managing task assignments for a plurality of work machines at a site may include: receiving, via one or more processors of an assignment engine system, first state data for at least one work machine operating at the site, wherein the first state data includes historical data of the at least one work machine, one or more operating condition of at least one component of the at least one work machine, real-time or near real-time location data of the at least work machine, or a combination thereof; receiving, via the one or more processors of the assignment engine system, second state data for the site, wherein the second state data includes characteristic data for material in the site and a plurality of tasks available at the site, wherein the plurality of tasks are associated with manipulation of the material in the site, and the characteristic data is indicative of energy consumption associated with the manipulation of the material by the at least one work machine; predict performance data and energy consumption data of the at least one work machine for a task; and selecting at least one task for the at least one work machine from the plurality of tasks available by inputting, via the one or more processors of the assignment engine system, the first state data and the second state data into a trained reinforcement-learning model, wherein the trained reinforcement-learning model has been trained, based on training first state data and training second state data to: learn an assignment policy that optimizes a reward function for the site, such that the trained reinforcement-learning model is configured to apply the learned assignment policy to the first state data, the second state data, and one or more predictions of the performance data and the energy consumption data of the at least one work machine to select the at least one task for the at least one work machine from the plurality of tasks available at the site; and causing, via the one or more processors of the assignment engine system, the at least one work machine to be operated according to the at least one selected task.

In another aspect, a computer-implemented method for training a machine-learning model for managing task assignments for a plurality of work machines at a site may include: receiving, via one or more processors of an assignment engine system, first state data for at least one work machine operating at the site, wherein the first state data includes historical data of the at least one work machine, one or more operating condition of at least one component of the at least one work machine, real-time or near real-time location data of the at least work machine, or a combination thereof; receiving, via the one or more processors of the assignment engine system, second state data for the site, wherein the second state data includes characteristic data for material in the site and a plurality of tasks available at the site, wherein the plurality of tasks are associated with manipulation of the material in the site, and the characteristic data is indicative of energy consumption associated with the manipulation of the material by the at least one work machine; assigning, via the one or more processors of the assignment engine system, at least one task from the plurality of tasks to the at least one work machine by inputting the first state data and the second state data into a trained reinforcement-learning model that includes a task assignment policy and a reward function; causing, via the one or more processors of the assignment engine system, the at least one work machine to be operated according to the at least one task assignment; receiving, via the one or more processors of the assignment engine system, further first state data and further second state data after a completion of the at least one task assignment; generating, via the one or more processors of the assignment engine system, a score using the reward function based on the further first state data and the further second state data; and updating the task assignment policy based, at least in part, on the generated score.

In a further aspect, a system for operating a plurality of work machines at a site may include: the plurality of work machines that are green-house-gas free and autonomous; a central controller, including at least one memory storing instructions; and at least one processor operatively connected to the at least one memory. The processor may be configured to execute the instructions to implement: a production planner configured to determine at least one task assignment for the plurality of work machines at the site; and a dispatcher configured to assign the at least one task assignment to at least one work machine. The dispatcher may have a trained reinforcement-learning model that has been trained, based on training first state data that includes historical data of the at least one work machine, one or more operating condition of at least one component of the at least one work machine, real-time or near real-time location data of the at least work machine, or a combination thereof and training second state data that includes characteristic data for material in the site indicative of energy consumption associated with manipulation of the material by the at least one work machine and a plurality of available tasks that are associated with the manipulation of the material in the site, to learn an assignment policy that optimizes a reward function for the site, such that the trained reinforcement-learning model is configured to apply the learned assignment policy to input first state data for the work machines and second state data for the site to select at least one task to assign to the work machines and an assignment engine. The assignment engine may be configured to perform operations, including: receiving the first state data; receiving the second state data; assigning the at least one task to the at least one work machine by inputting the first state data and the second state data into the trained reinforcement-learning model; and causing the at least one work machine to be operated according to the at least one task assignment.

Other features and aspects of this disclosure will be apparent from the following description and the accompanying drawings.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2B, 2D, and 2F illustrate a scenario for monitoring the state-of-charge and/or state-of-health of batteries associated with work machines operating at a worksite, according to aspects of the disclosure.

FIGS. 2C, 2E, and 2G illustrate a zoomed view of the state-of-charge displayed in the dashboards of the work machines depicted in FIGS. 2B, 2D, and 2F, respectively, according to aspects of the disclosure.

FIG. 4D depicts a flowchart of an exemplary method for training the reinforcement learning model by updating task assignment policy based on a scoring mechanism, according to aspects of the disclosure.

DETAILED DESCRIPTION

Figure 1:
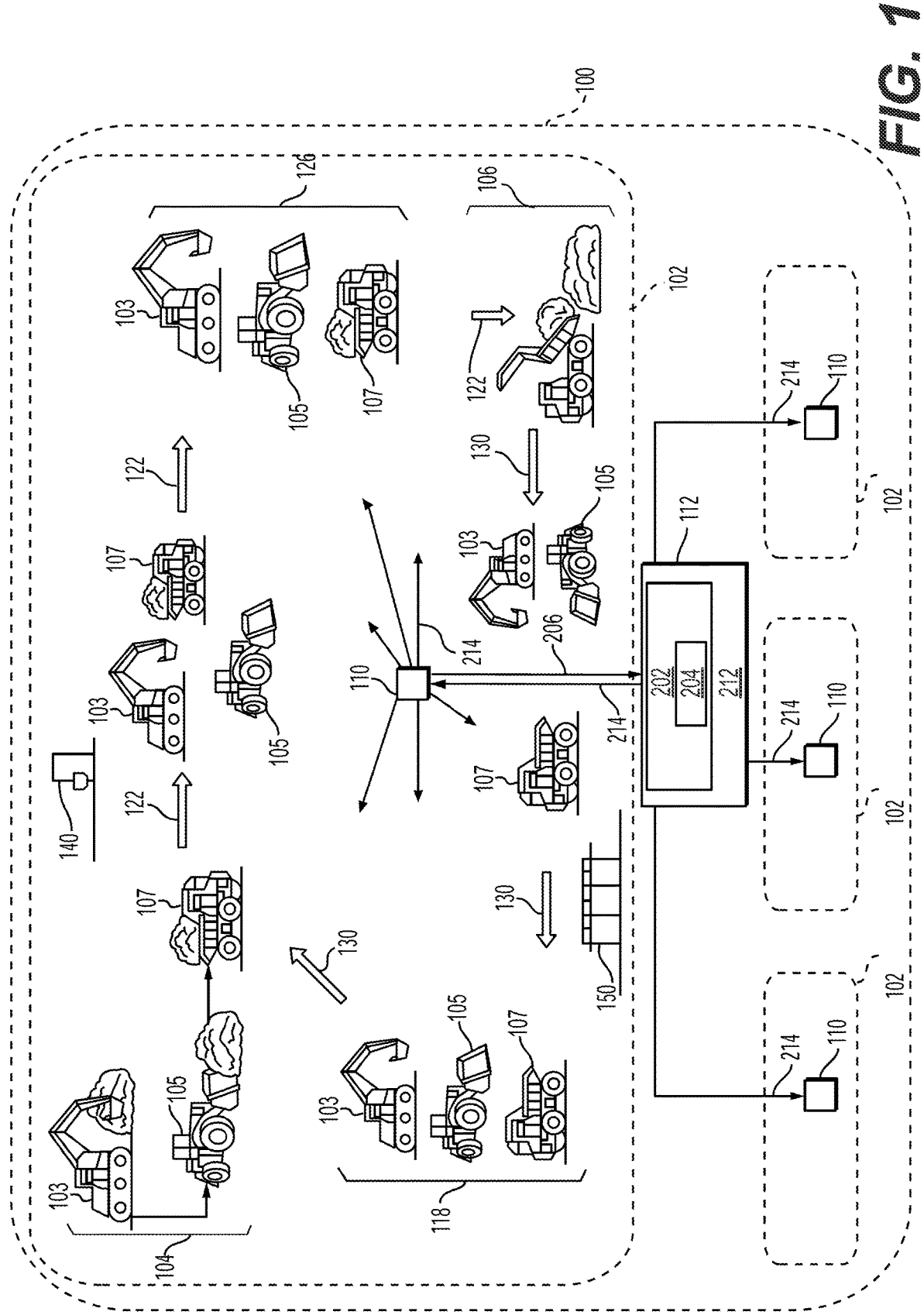
FIG. 1 depicts an exemplary schematic for a site operated by a fleet of GHG free work vehicles, according to aspects of the disclosure.

According to certain aspects of the disclosure, methods and systems are disclosed for assigning tasks to a fleet of vehicles at a worksite, e.g., digging machines (excavators, backhoes, dozers, drilling machines, trenchers, draglines, or any other suitable work machines), loading machines (wheeled or tracked loader, a front shovel, an excavator, a cable shovel, a stack reclaimer, or any other similar machines), hauling machines (articulated truck, an off-highway truck, an on-highway dump truck, a wheel tractor scraper, or any other similar machine), etc., or combinations thereof (all of the above listed vehicles/machines collectively referred to herein as "work machines"). In an example, an assignment engine may utilize machine-learning techniques to perform operations such as automatically dispatching a digging machine to excavate material at the worksite, a loading machine to load the excavated material onto a hauling machines, and/or the hauling machine to carry the excavated materials between different locations within the worksite. Systems and methods are described for using machine-learning, e.g., reinforcement-learning, to learn a policy executed by the assignment engine. By training the assignment engine, e.g., via reinforcement-learning, to learn associations between available task assignments, the current state of the fleet of vehicles, and a current state of the worksite, the learned policy may be used to optimize the operation of the worksite for one or more goals such as total operating cost, energy consumption, material excavation rate, material loading rate, material movement rate, etc.

A "reinforcement-learning model" is a type of machine-learning model that generally receives information about an environment as input, applies one or more weights and biases or the like to such input, and then applies the result therefrom to a policy usable to select the next action for the model, however in some cases, such weights or biases may be at least partially integrated into the policy. Generally, the policy of a reinforcement-learning model is trained using a reward function, e.g., an objective classification for cumulative benefit to the system. Results of the actions taken by the model are used with the reward function to determine the cumulative value of the actions, which may be fed back into the model to reinforce behaviors that had a positive effect on the cumulative benefit and/or de-emphasize behaviors that had a negative effect. In one example, environment information is, via a current version of the policy, associated with one or more actions. The actions are performed, resulting in a change to the environment, which may be scored with the reward function. The score is then used to adjust the association between the environment and one or more actions. The amount that the association may be changed in each update may define how quickly the model learns. During training, various actions and environments may be enacted so as provide a wider variety of feedback for the model. In this manner, a reinforcement-learning model may be trained to take actions that not only may have an immediate benefit to the system, but also have a long-term benefit. Further aspects of the use of such a model are discussed in further detail below.

In the description that follows, exemplary embodiments of autonomous digging machines, loading machines, and/or hauling machines are used for sake of description, as this represents an application that can benefit from the advantages of the disclosed system and method, but it should be appreciated that the systems and methods described herein are applicable to any other application used to control assets, e.g., work machines, at a site, whether those assets are operated manually or autonomously. It should be appreciated, however, that even manually operated assets can benefit from automated dispatch systems and methods as described herein, e.g., via efficient assignment of tasks to the manual operators. It should also be understood that the examples above are illustrative only. The techniques and technologies of this disclosure may be adapted to any suitable activity.

In an exemplary use case, an assignment engine is used to assign one or more next tasks to at least one digging machine, loading machine, and/or hauling machine used to operate a site, e.g., according to a material movement plan for the site. An assigned task is generally associated with an arc, e.g., a particular route to a destination or destination type. An arc may be, for example, a production arc, a return arc, a charge arc, a maintenance arc, etc. Production arcs generally indicate travel segments for digging machines, loading machines, and/or hauling machines, in which the digging machine travels to a source location to excavate material, the loading machine travels to load the excavated material onto the hauling machines, and the hauling machine travels to carry the excavated materials. Return arcs generally represent travel segments, in which the digging machine, loading machine, and/or hauling machine upon completion of the assigned task travels to the next source location for a newly assigned task. A charge arc generally indicates charging segments, in which the digging machine, loading machine, and/or hauling machine travel from a current location to a static charging station for charging or refueling, and/or travels along a route that includes a dynamic charging device that enables charging during travel. A maintenance arc generally indicates a maintenance segment, in which the digging machine, loading machine, and/or hauling machine travel to a maintenance lot for maintenance. An arc may be assigned, based on a policy of the assignment engine, in any order or arrangement. Further, along with an arc, the assigned task may include other information such as whether the digging machine, loading machine, and/or hauling machine should utilize dynamic charging during travel, e.g., by using a trolley or electrified rail, and/or a particular speed at which the route should be traveled. As discussed in further detail below, by accounting for and including such information, the assignment engine may reduce queuing time of the digging machines, loading machines, and/or hauling machines on the site, enable opportunistic charging, reduce the energy consumption of the site, reduce idle time or time spent at a static charging station, increase material digging, loading, and/or movement efficiency, and/or decrease total operating cost of the site.

In another exemplary use case, a reinforcement-learning model may be trained to generate a policy for the assignment engine. Training state information for digging machines, loading machines, and/or hauling machines, as well as training state information for a site may be fed to a reinforcement-learning model to develop a policy that optimizes a reward function of the model. In one instance, the training state information for the digging machines, loading machines, and/or hauling machines may include data describing characteristics of these machines, e.g., state-of-charge, state-of-health, real-time or near real-time location data, real-time or near real-time speed data, age data, time since last maintenance, performance data, efficiency data, or the like. In one instance, the training state information for the site may include one or more data indicative of tasks available at the site, state or occupancy information for one or more static charging stations, state or occupancy information for one or more dynamic charging devices, attributes of the materials at the site, a source or loading site, a sink or dumping site, any equipment or device associated with the site, information regarding available roads, road conditions, weather conditions, power availability or limitations, etc. for the site. In some instances, the state information for the site may include or be based on a production plan and/or a material movement plan for the site. In some instances, the training state information may include and/or be based on one or more simulations or models. For example, one or more models of a digging machine, a loading machine, and/or a hauling machine may be used to simulate the state information prior to the operations as these machines are used to execute one or more simulated tasks. In one example, a model or simulation of the digging machine, loading machine, and/or hauling machine may be used to determine a modeled or simulated characteristic, such as how long these machines may operate at a different speed or with different materials based on state information, such as state-of-charge. In some embodiments, at least a portion of the operation of the site may be simulated, e.g., based on one or more of the material movement plans, a simulation model of the site, or the one or more models of the digging machine, loading machine, and/or hauling machine. However, in some embodiments, at least a portion of the training data may be sourced from actual digging machines, loading machines, hauling machines, and/or site(s).

The reward function may be configured to optimize one or more objectives, such as (i) reducing total operating cost, (ii) reducing power consumption, (iii) balancing usage and/or battery lifespan of the digging machine, loading machine, and/or hauling machine, (iv) increasing material digging, loading, and/or movement rate, (v) decreasing idle time and/or queuing of the digging machine, loading machine, and/or hauling machine, (vi) reducing unoccupied loading or dumping sites, (vii) improving or maintaining the quality of performance by the digging machine, loading machine, and/or hauling machine, and (viii) ensuring a particular type, quantity, and/or grade of material is processed and/or transported to a particular destination, etc. As actions are performed, e.g., by the simulated and/or real machines, outcomes of such actions may be ascribed scores based on the reward function.

In one instance, feedback from such scores may be used to adjust the policy of the reinforcement-learning model, e.g., using any suitable machine-learning technique. The performance of actions and the adjustment of the policy may be iterated. For example, the policy may be adjusted in real-time, after every action, after a set number of actions, after a set period of time, or based on any other suitable metric. Such iteration may be continued for a predetermined number of iterations, until the score reaches a predetermined threshold, until the score appears to reach a steady-state or has a rate of change below a further predetermined threshold, for a predetermined period of time, until the scores achieve a steady-state, or any other suitable criterion or combination thereof. In some embodiments, the iteration may continue until the score reaches an optimum or optimized value, as determined by any suitable criteria. A learned policy may be used, e.g., by an assignment engine, to select the next assignments for the digging machines, loading machines, and/or hauling machines. In some embodiments, further state data from the site may be used to tune or update a model for one or more of the digging machines, loading machines, and/or hauling machines, tune or update a model for the site, or tune, update, or continue to train the reinforcement-learning model.

A schematic view of site 100, e.g., a construction site, a mine site, or any other suitable site in accordance with the disclosure, is shown in FIG. 1. Site 100 may include one or more production circuits 102, which may include one or more production sites 104, one or more destination sites 106, one or more digging machines 103, one or more loading machines 105, and/or one or more hauling machines 107, e.g., traveling between or in operation at various locations in site 100 such as the production sites 104 and destination sites 106. It should be appreciated that, depending on the material being produced, each circuit 102 may exclusively include its respective production sites 104 and destination sites 106. Alternatively, one production site 104 and/or one destination site 106 may be part of more than one circuit 102, for example, when material from one production site 104 is used at more than one destination site 106 or, similarly, when the production at a destination site 106 requires material from more than one production site 104.

One or more of the digging machines 103, loading machines 105, and/or hauling machines 107 may be a GHG free vehicle, e.g., a battery-operated electric vehicle or a vehicle with an onboard electrical power generation and/or storage device. Each digging machine 103, loading machine 105, and/or hauling machine 107 may include one or more sensors or devices (not shown) that may determine or track various characteristics descriptive of their current state. Such characteristics may include, for example, state-of-charge for a power storage device, state-of-health for the power storage device, temperature for the power storage device, rate of charge or discharge for the power storage device, operating temperature, operational time, vehicle age, location, speed, tire pressure, incline angle, etc. In one instance, the one or more sensors or devices may determine or track various characteristics of the materials being excavated, loaded, and/or hauled, for example, material type, material grade, material weight, material density, material texture, material hardness, moisture content of the material, the destination for the material, e.g., a next processing step such as a crusher, a storage location, or a destination such as a customer or job site. As will be discussed in further detail below, one or more of such characteristics and/or other state information from site 100 may be used to determine, model, or simulate further characteristics of digging machine 103, loading machine 105, and/or hauling machine 107.

In one instance, site 100 may further include one or more charging stations or devices, such as one or more static charging stations 140 or one or more dynamic charging devices 150. Static charging stations 140 and/or dynamic charging devices 150 may be configured to engage with and charge one or more digging machines 103, loading machines 105, and/or hauling machines 107, and may be associated with a particular production circuit 102, multiple production circuits 102, and/or may not be particular to any specific production circuits 102. In some embodiments, static charging station 140 and/or dynamic charging station 150 may be configured to charge and/or power other equipment on site 100, e.g., a crusher, a road grader, a people carrier, or any other suitable machine or vehicle. Static charging station 140 may be co-located with other equipment on the site, e.g., to facilitate charging while digging machine 103, loading machine 105, and/or hauling machine 107 is utilizing such equipment and/or to facilitate powering or charging such equipment.

In one instance, static charging station 140 may include one or more charging connections (not shown), e.g., a charging plug or the like, configured to charge the energy storage device of the digging machine 103, loading machine 105, and/or hauling machine 107 when parked at and engaged with the charging connection. In other instances, the static charging station 140 may provide various types of fuel, such as hydrogen fuel, gasoline, diesel, biofuel, or any other suitable fuel or combinations thereof. Static charging station 140 may be co-located with another site such as a production site 104 so that digging machine 103, loading machine 105, and/or hauling machine 107 may be at least partially charged while visiting the production site 104, or the like. The charging station 140 may include one or more sensors (not shown) configured to track and/or determine occupancy or availability of the charging connections, power available for charging, power discharge rate, total power discharged, etc.

In one instance, dynamic charging device 150 may include, for example, a trolley device, electrified rail, or the like that is positioned along at least a portion of a route within site 100, and may be configured to propel and/or at least partially charge the digging machine 103, loading machine 105, and/or hauling machine 107 as they travel along the portion of the route. As will be discussed in further detail below, engaging with a dynamic charging device 150 may modify the performance of the digging machine 103, loading machine 105, and/or hauling machine 107, e.g., reduce the maximum travel speed to increase a charging rate or increase the maximum travel speed to reduce travel time, or the like. Modifying the travel speed, such as in the foregoing illustrative examples, may, e.g., via the reward function, facilitate optimization of available power, charge needed for the digging machine 103, loading machine 105, and/or hauling machine 107 to perform an assignment, production goals for material at site 100, or the like. Dynamic charging device 150 may include one or more sensors (not shown) configured to track and/or determine occupancy or availability, power available for charging, and/or power discharge rate at dynamic charging device 150.

Each circuit 102 may include one or more controller 110 that may monitor, control, and/or relay information to or from digging machine 103, loading machine 105, and/or hauling machine 107, and other machines that may be operating within each particular circuit 102. Site 100 may include a central controller 112 that may communicate with the various circuit controllers 110 to relay and exchange high-level information that pertains to site 100 as a whole. However, other arrangements and architectures are also contemplated.

Site 100 may include power generation means (not shown), e.g., a solar power plant or the like, or may include a power grid connection. Central controller 112 may monitor and/or regulate an amount of power fed to site 100. For example, the central controller 112 may be configured to establish a maximum amount of power fed to site 100 per day, a maximum rate of power supplied to site 100, or the like. Such maximums may be based on availability, pre-existing agreements, e.g., with a power generation entity, costs for the supplied power, etc. As discussed in further detail the foregoing may also be used as input when optimizing operations of digging machine 103, loading machine 105, and/or hauling machine 107.

Production site 104 may be operated by a digging machine 103 and/or loading machine 105. During operation, hauling machine 107 may arrive at production site 104. Loading machines 105 may then load the excavated materials onto hauling machine 107. In one instance, a production queue 118 may stack incoming digging machines 103, loading machines 105, and/or hauling machines 107 based, at least in part, on the requirement, availability, preference, or a combination thereof. Loaded hauling machine 107 may travel arc 122 towards destination site 106. Digging machines 103 and/or loading machines 105 may also travel arc 122 to different production sites upon completion of the assigned tasks. In another instance, digging machines 103, loading machines 105, and/or hauling machine 107 may be stacked at queue 126. While at queue 126, digging machines 103 and/or loading machines 105 may wait for the next task assignment, whereas hauling machine 107 may wait for availability at destination site 106 to dump the materials. Digging machines 103, loading machines 105, and/or emptied hauling machines 107 may travel non-production arc 130 to different production sites before repeating arc 122. It should be understood that tasking a digging machine 103, loading machine 105, and/or hauling machine 107 to static charging station 140 and/or dynamic charging device 150, e.g., a charging arc, may be integrated before, into, or after arc 122 or non-production arc 130, e.g., instead of stacking machines 103, 105, and 107 in a queue. In particular, machines 103, 105, and 107 may utilize dynamic charging device 150 while traveling if instructed to do so, if dynamic charging device 150 is available. This process, or a variant thereof, may be carried out in each of circuits 102 during operation.

The rate of material excavated, loaded, and/or transferred from production site 104 to destination site 106 can be generally quantified and compared to a target production rate defined within a production plan or material movement plan for circuit 102. This production rate, from an asset engagement perspective, occupies digging machines 103, loading machines 105, and/or hauling machines 107 that are assigned to, or engaged in, the particular circuit 102 during operation.

In any given circuit, longer wait times of digging machines 103, loading machines 105, and/or hauling machines 107 in queues 118 and 126 can slow down the scheduled operation thereby reducing the overall production rate for that particular circuit. Further, it may be beneficial to optimize the operation of site 100 to one or more different objectives, such as minimizing the total cost, total power consumption, rate of material movement, or compliance with a production plan or material movement plan. In general, a material movement plan for the site defines the amount of material excavated, loaded, and/or moved from one or more locations in site 100 to one or more other locations in site 100. The excavated, loaded, and/or moved material can be expressed as a total tonnage of material over a period of time or a rate of transfer of material in tons per hour, and the like. To address the foregoing at least in part, the assignments to digging machines 103, loading machines 105, and/or hauling machines 107 within a circuit may be modified.

As illustrated in FIG. 1, site 100, e.g., central controller 112, may include production planner 202, e.g., to determine and/or define tasks available at site 100, and dispatcher 212, e.g., to assign digging machines 103, loading machines 105, and/or hauling machines 107 to the available tasks such as to a particular arc or operation. However, any suitable arrangement or architecture may be used, e.g., an arrangement in which production planner 202 and dispatcher 212 are integrated into a single component.

The production planner 202 may be configured to receive as input a production plan or material movement plan 204. The production plan 204 may be manually or automatically input into production planner 202 and can include information on the desired or target production for site 100, e.g., on a daily basis, production goals for the mid or long-term operation, production types and timing of product delivery for site 100, scheduling, and other information relating directly to the desired type, amount and timing of site output or production. This information may be input by a user by defining various system parameters included in a software application that is operating within production planner 202, or may alternatively be provided automatically, for example, by processing customer orders for material that are submitted by customers, for example, over an internet-based ordering system. Regardless of the type or method of input of this information, production plan 204 may be provided to production planner 202 and may serve as a basis for all or most subsequent operations in dispatch system 200.

In addition to production plan 204, production planner 202 may further receive site state information 206 as an input, which may be provided manually by a site operator or can be extracted automatically by production planner 202. Site state information 206 may include one or more of information indicative of the number and operational state of digging machines 103, loading machines 105, and/or hauling machines 107 that are available for work at any one time, the number, capacity and operational state of loading tools, processors, materials and blocks that are active, the type of material blocks that are active, the location of material blocks, the status of charging devices, power availability and/or costs for site 100, weather conditions, fuel and/or power costs, maintenance and cost rates, or the like. Site state information 206 may include, for example, information regarding power drawn by and/or available to other equipment on the site. For example, in an arrangement where a static charging station 140 is also used to charge and/or power other equipment, the operational state of the other equipment may affect the power available by the static charging station 140 to charge a digging machine 103, loading machine 105, and/or hauling machine 107.

In general, site state information 206 may provide information indicative of all useable resources and components available at any given time at site 100 for production, e.g., excavation, loading, and/or transportation, and processing of materials produced or placed at site 100. Based on such input, the production planner 202 may determine available tasks, e.g., production arc information, return arc information, charging instructions, maintenance instructions, etc. Any suitable technique for determining available tasks may be used, e.g., manual, semi-autonomous, or autonomous determinations such as the techniques described in the above-referenced U.S. 2021/0334720 A1.

In an arrangement in which at least a portion of digging machines 103, loading machines 105, and/or hauling machines 107 are GHG free vehicles such as electric vehicles, the site state information 206 may further include information indicative of an amount of charge needed to perform various operations. For example, the state information may include information indicative of an amount of charge needed to travel along a particular route, a rate of charge drained per distance traveled, a change in charge drain rate due to the amount of material being excavated, loaded, and/or hauled, condition of a road/route, an amount of charge per time from charging at a static charging station 140 or via a dynamic charging device 150. Such information may be at least partially determined based on other information. For example, a rate of discharge per distance traveled for a digging machine 103, loading machine 105, and/or hauling machine 107 and a distance of a particular arc may be used to predict an amount of charge needed for the arc. Such information may be nominal information that may tune an individual digging machine 103, loading machine 105, and/or hauling machine 107, e.g., via a model or simulation, as discussed in further detail below. Such information may further include additional information about site 100, such as locations of various sites and operations, distances for routes there-between, road inclinations, hours of operation, times and/or frequency of shift changes, schedules for down-time, e.g., for inspections, or the like, etc. At least a portion of the aforementioned information may be included in the material movement plan or production plan 204. At least a portion may be determined based on data received from one or more sensors or devices on site 100 or external data such as satellite imagery or site plans or the like. At least a portion may be entered manually. At least a portion may be determined and/or tuned based on a model or simulation of site 100, as discussed in further detail below.

In one instance, assignment engine 220 may select a task of loading materials from the plurality of available tasks in site 100. Assignment engine 220 may process state data that includes characteristic data of the materials being loaded, e.g., material type information, material density information, material weight information, and/or material texture information. Assignment engine 220 may process state data that includes weather information during the time of the task, e.g., heavy rain resulting in the materials being wet, heavy snow adding to the weight of the materials and affecting visibility, strong wind blowing the materials away, or any other weather conditions that impact the task of lifting the materials. Assignment engine 220 may determine the actual demand of the operation of loading the materials based, at least in part, on the processed characteristic data of the materials and the weather information. Assignment engine 220 may process state data that includes data associated with the one or more loading machines 105 at site 100, e.g., model information, past performance data, productivity data, and/or power consumption data, to determine the amount of power drawn by the one or more loading machine 105 per quantity/weight of materials being loaded. Assignment engine 220 may select at least one loading machine 105 from the one or more loading machine 105 that is most optimal for meeting the actual demand of the operation.

In one instance, assignment engine 220 may select a task of excavating materials from the plurality of available tasks in site 100. Assignment engine 220 may process state data that includes characteristic data of the materials being excavated, e.g., material hardness information, material texture information, and/or moisture content of material. Assignment engine 220 may process state data that includes weather information during the time of the task, e.g., heavy snow adding to the hardness of the materials, heavy rain causing difficulty while digging the materials, or any other weather conditions that impact the task of excavating the materials. Assignment engine 220 may determine the actual demand of the operation of excavating the materials based, at least in part, on the processed characteristic data of the materials and the weather information. Assignment engine 220 may process state data that includes data associated with the one or more excavating machines 103 at site 100, e.g., state-of-health of the buckets and the digging teeth that are utilized during digging the materials, past performance data, productivity data, and/or power consumption data, to determine the amount of power drawn by excavating machine 103 per quantity/weight of materials being excavated. Assignment engine 220 may select at least one excavating machine 103 from the one or more excavating machine 103 that is most optimal for meeting the actual demand of the operation.

In one instance, optimization of site resource utilization can vary greatly based on the various assignments that are made to achieve a target production rate via the various production arcs and return arcs and other tasks. Other optimization goals that may be implemented instead of or in addition to the target production rate may include, for example, a total operating cost, an amount of power used, a lifetime of the digging machine 103, loading machine 105, and/or hauling machine 107, utilization of site downtime for vehicle charging, a rate of opportunistic charging, etc. Optimization goals may be preset and/or may be tuned or selected manually.

This optimization task may be carried out by dispatcher 212, which may receive the task information from production planner 202. The dispatcher 212 may process the task information, and send dispatch commands, e.g., task assignments 214 to various digging machines 103, loading machines 105, and/or hauling machines 107. The task assignments 214 may be specific commands for each digging machine 103, loading machine 105, and/or hauling machine 107 in each circuit 102 to perform a specific task. Task assignment 214 may include, for example, a destination to perform the task, a route to the destination, a speed for travel, e.g., for the trip or for various stages of the trip, a charging requirement, a dynamic charging device usage plan, an intersection priority, etc. In one instance, a dynamic charging device usage plan may include, for example, an instruction or request for travel speed, charging, travel time, or the like, for the digging machine 103, loading machine 105, and/or hauling machine 107 with regard to dynamic charging device 150. In one instance, an intersection priority may indicate priority for a digging machine 103, loading machine 105, and/or hauling machine 107 when the travel path of multiple digging machines 103, loading machines 105, and/or hauling machines 107 overlaps, and may define or facilitate modifying travel speed, pausing the travel, and/or redirecting a digging machine 103, loading machine 105, and/or hauling machine 107 to reduce or remove the overlap. In one instance, the digging machine 103, loading machine 105, and/or hauling machine 107 may be redirected to a static charging station 140.

Pre-determining such an intersection priority may also reduce computational time and/or load experienced in the event of such an overlap. The likelihood of an overlap may also be used as a factor for the reward function, e.g., so that assignments are made that are less likely to result in overlaps. Intersection priority may be at least partially based on characteristics of the digging machines 103, loading machines 105, and/or hauling machines 107 with a potential overlap, e.g., type or grade of material being excavated, loaded, and/or carried, whether the destination for the digging machine 103, loading machine 105, and/or hauling machine 107 is occupied or is available, etc. Intersection priority may be determined via the dispatcher 212, e.g., as part of an assignment for a particular digging machine 103, loading machine 105, and/or hauling machine 107.

In one instance, digging machines 103, loading machines 105, and/or hauling machines 107 may be operated by a human operator or may be partially self-driven. While the digging machine 103, loading machine 105, and/or hauling machine 107 may perform various tasks, performance information is provided back to the dispatcher 212, e.g., via sensors and/or devices of machines 103, 105, and 107 and/or of site 100, that indicates task progress, machine position, diagnostics and/or other information, such that subsequent tasks can be assigned to a digging machine 103, loading machine 105, and/or hauling machine 107 when a previously assigned task is completed.

In one instance, tasks, e.g., tasks that are in progress, may be assigned to digging machines 103, loading machines 105, and/or hauling machines 107. For example, a rate of discharge for a digging machine 103, loading machine 105, and/or hauling machine 107 may exceed a predicted rate, such that the digging machine 103, loading machine 105, and/or hauling machine 107 may be in danger of failing to complete the task. Detection of such deviance may cause dispatcher 212 to re-task the digging machine 103, loading machine 105, and/or hauling machine 107, e.g., assign the digging machine 103, loading machine 105, and/or hauling machine 107 a new task or superseding the task to cause the digging machine 103, loading machine 105, and/or hauling machine 107 to receive charging.

As noted above, dispatcher 212 may be operating within central controller 112, and may be configured to disseminate information between central controller 112 and various circuit controllers 110, which in turn relay information to/from the various assets including the digging machine 103, loading machine 105, and/or hauling machine 107. The dispatcher 212, like production planner 202, may be implemented in the form of computer-executable instructions in non-transitory computer media includes an algorithm that uses various computational or algorithmic methods to process the target production and return arcs into particular assignments for the digging machine 103, loading machine 105, and/or hauling machine 107. As such, dispatcher 212 may be implemented in the form of computer hardware and/or software that includes memory devices, user input and output instrumentalities, a processor, database, wired and/or wireless communication devices and other structures that are configured to receive, process and send information to/from production planner dispatcher 212 and various other external systems including systems operating and/or controlling operation of digging machine 103, loading machine 105, and/or hauling machine 107.

During operation, dispatcher 212 may operate using various methods including statistical methods and AI models to minimize the time spent by digging machines 103, loading machines 105, and/or hauling machines 107 executing non-production arcs 130. To achieve this result, it is often the case that digging machine 103, loading machine 105, and/or hauling machine 107 may not return to the same loading location from which it was loaded on the production arc that was just completed, but rather be re-routed to a different production location, possibly within a different circuit 102, that is either closer, has a higher priority, or is expected to be ready to load sooner than other loading locations. To determine the optimal next task assignment 214 for digging machine 103, loading machine 105, and/or hauling machine 107, dispatcher 212 may employ an assignment engine that utilizes one or more machine-learning techniques, as discussed in further detail below.

Figure 2A:
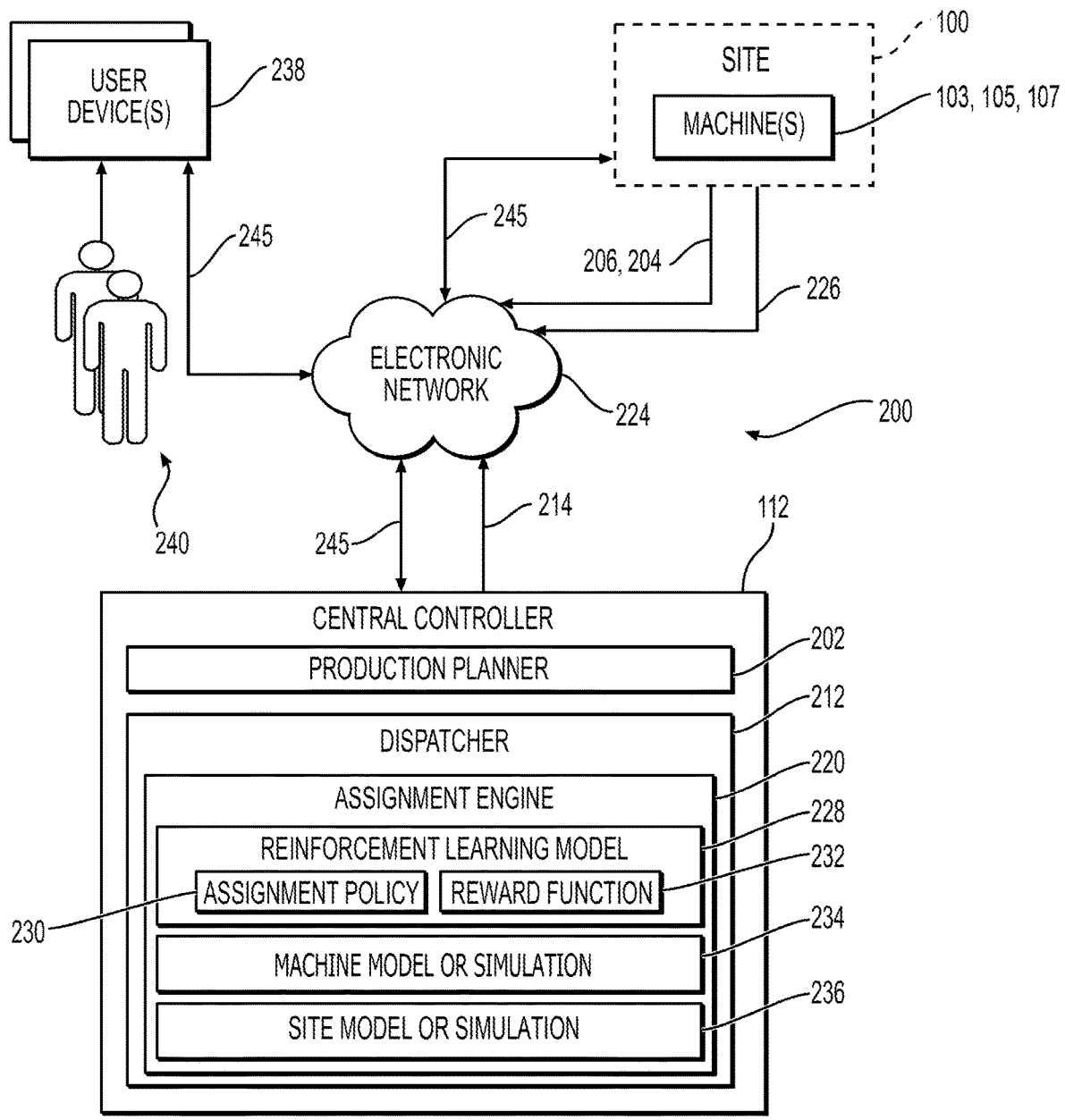
FIG. 2A depicts a dispatcher of a central controller of the site of FIG. 1, according to aspects of the disclosure.

FIG. 2A depicts an exemplary embodiment of dispatcher 212 from FIG. 1 that includes an assignment engine 220 that may employ one or more machine-learning techniques, e.g., to determine task assignments 214 as discussed in further detail below. As shown in FIG. 2A, dispatcher 212 may be operating within central controller 112, which may relay task assignments 214 from assignment engine 220 to various devices of site 100 including the digging machine 103, loading machine 105, and/or hauling machine 107, e.g., via electronic network 224. Although illustrative examples of assignments for the digging machine 103, loading machine 105, and/or hauling machine 107 are included below, it should be understood that the dispatcher 212, may be configured to generate task assignments 214 for any suitable equipment/machines on the site, e.g., crushers, road graders, clean-up dozers, people carriers, etc. For example, task assignments for site 100 may include instructions for equipment/machines other than a digging machine 103, loading machine 105, and/or hauling machine 107 to be charged and/or powered by a static charging station 140 or dynamic charging station 150.

In addition, assignment engine 220 may be configured to receive, via the central controller 112, site state information 206, machine state information 226, and/or other data. The assignment engine 220 may include, for example, a reinforcement-learning model 228 that includes an assignment policy 230 and a reward function 232. The assignment engine 220 may further include one or more models or simulations, e.g., at least one machine model or simulation 234 or at least one site model or simulation 236. The dispatcher 212, assignment engine 220, central controller 112, and/or other devices (not shown) may be accessible via or in communication with one or more user device(s) 238, e.g., via the electronic network 224 in the form of communications 245. The one or more user device(s) 238 may be associated with user 240, e.g., a site controller and/or a user associated with one or more of generating, training, or tuning the reinforcement-learning model 228, the reward function 232, and/or one or more of the simulations or models 234 or 236.

While an illustrative arrangement is depicted in FIGS. 1 and 2A-2H, systems and devices of site 100 may communicate in any arrangement. As will be discussed herein, systems and/or devices of site 100 may communicate in order to generate, train, or use a machine-learning model to optimize task assignments 214 for site 100, among other activities.

In one instance, user device 238 may be configured to enable user 240 to access and/or interact with other systems in site 100. For example, user device 238 may be a computer system, such as a desktop computer, a mobile device, a tablet, etc. User device 238 may include one or more electronic application(s), e.g., a program, plugin, browser extension, etc., installed on a memory of user device 238. The electronic application(s) may be associated with one or more of the other components in site 100. For example, the electronic application(s) may include one or more system control software, system monitoring software, software development tools, site planning software, simulation software, regulation or compliance software, etc. User device 238 may enable user 240 to manually generate or adjust information or setting for site 100, e.g., for production planner 202, dispatcher 212, assignment engine 220, and/or other equipment or devices for site 100. In an illustrative example, user device 238 may enable user 240 to tune or adjust reward function 232, e.g., to adjust the optimization objectives of the reinforcement-learning model 228. User device 238 may be configured to generate an output indicative of data associated with site 100, e.g., positions or activities of the digging machines 103, loading machines 105, and/or hauling machines 107, capacities or availabilities of equipment or devices, a material production rate, an operating cost rate, a power consumption rate, statistics such as average idle time or queue time for the digging machine 103, loading machine 105, and/or hauling machine 107, etc. Such output may, for example, be generated or determined by user device 238 and/or by central controller 112, e.g., based on site state information 206, and/or machine state information 226.

The electronic network 224 may be a wide area network ("WAN"), a local area network ("LAN"), personal area network ("PAN"), or the like. Electronic network 224 includes the Internet, and information and data provided between various systems occur online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, assignment engine 220 may generate, store, train, or use reinforcement-learning model 228 configured to generate assignment policy 230 or apply assignment policy 230 to assign one or more tasks, e.g., to digging machine 103, loading machine 105, and/or hauling machine 107 of site 100. Assignment engine 220 may further include instructions associated with reinforcement-learning model 228, e.g., instructions for generating reinforcement-learning model 228, training reinforcement-learning model 228, using the reinforcement-learning model 228, etc.

In one instance, central controller 112 or assignment engine 220 may include training data used or usable to train reinforcement-learning model 228. In one instance, a system or device other than central controller 112 may be used to generate and/or train reinforcement-learning model 228. For example, such a system may include instructions for generating reinforcement-learning model 228, the training data, and/or instructions for training reinforcement-learning model 228. A resulting trained reinforcement-learning model 228 may then be provided to assignment engine 220.

Generally, a machine-learning model includes a set of variables, e.g., nodes, neurons, filters, etc., that are tuned, e.g., weighted or biased, to different values via the application of training data. In reinforcement-learning, such as the learning used with the reinforcement-learning model 228, machine-learning techniques are used to train/generate a policy for taking various actions that have a cumulative positive effect as interpreted by a reward function. Generally, the model is configured to receive one or more inputs descriptive of an environment, e.g., the site 100 and the devices and/or digging machines 103, loading machines 105, and/or hauling machines 107 of site 100. The policy is then applied to the inputs. The policy may be in the form of one or more weights and biases applied to the input data. The policy may be initialized with random values for the weights and biases, and/or may be initialized with random relationships between various inputs. At least a portion of the initial policy may be manually generated or sourced from a pre-trained model, or the like. To train the model, e.g., develop or tune the policy, training input is provided, whereby the policy is used to determine the next actions, e.g., task assignments 214 for digging machines 103, loading machines 105, and/or hauling machines 107 of the site. Once task assignments 214 have been completed, the state of site 100 environments, e.g., site 100, may be re-evaluated against the reward function to determine the efficacy of the current state of the policy. Further, the outcome from the reward function may be fed back into the model, whereby a relatively higher score may be used to reinforce the weights, biases, or relationships that were used in the policy that resulted in better outcomes, and a relatively lower score may be used to de-emphasize portions of the policy resulting in worse outcomes. Thus, over the course of training, the policy generally trends toward increased satisfaction of the reward function.

Training may be conducted in any suitable manner, e.g., in batches, and may include any suitable training methodology. A portion of the training data may be withheld during training and/or used to validate the trained machine-learning model, e.g., to evaluate the efficacy of the trained policy. The training data for the reinforcement-learning model 228 may include historical state information from site 100 and/or other sites. Training may be performed periodically, and/or continuously, e.g., in real-time or near real-time. For example, a stream of state information from site 100 and/or from digging machines 103, loading machines 105, and/or hauling machines 107 may be used to refine and/or improve reinforcement-learning model 228. Such a stream, and or real-time or near real-time refinement may facilitate adaptation of the reinforcement-learning model 228 to changing conditions such as, for example, weather conditions that may impact road conditions, breakdown of a digging machine 103, loading machine 105, and/or hauling machine 107 or other site equipment, a schedule change, a production requirement change, a safety hazard, etc.

The training data may include simulated state data, e.g., resulting from a machine model or simulation 234 and/or a site model or simulation 236, as discussed in further detail below. Simulated state data may be used to train the reinforcement-learning model 228 in a first training phase, and actual state data from site 100 and digging machine 103, loading machine 105, and/or hauling machine 107 may be used to train the reinforcement-learning model 228 in a second training phase. Any suitable training schema or procedure may be used.

As noted above, the policy of a reinforcement-learning model may include any number of variables applied to the input. The variables of the policy may be interrelated in any suitable arrangement. In one example, the policy may be represented as a single node, whereby the input to the node is the input state data and the output of the node is indicative of a selected action. In a deep learning model, the policy may include multiple nodes, whereby one or more nodes may be the input for subsequent nodes instead of or in addition to the input. Any suitable deep learning architecture may be used.

For example, the architecture used by the reinforcement-learning model 228 may include a Recurrent Neural Network ("RNN"). Generally, RNNs are a class of feed-forward neural networks that may be well adapted to processing a sequence of inputs. The machine-learning model may include a Long Short Term Memory ("LSTM") model. An LSTM model may be configured to generate an output from a sample that takes at least some previous samples and/or outputs into account. Such architectures may enable or facilitate behavior of the policy that accounts for both short-term and long-term considerations with regard to the reward function.

In one instance, reward function 232 for reinforcement-learning model 228 may be implemented to determine an objective score after the completion of one or more assigned tasks using various factors based on data, such as site state information 206 and/or machine state information 226 from a point in time after the tasks are complete. Data used to score the reward function may be obtained from one or more sensors or devices of site 100, obtained from another system, entered manually, or the like. The factors for the reward function may include, for example, (i) amount and/or rate of opportunistic charging and/or dynamic charging by the digging machines 103, loading machines 105, and/or hauling machines 107, (ii) whether any of the digging machines 103, loading machines 105, and/or hauling machines 107 ran out of charge, (iii) an occupancy rate of equipment or machines of site 100, (iv) state-of-charge for digging machines 103, loading machines 105, and/or hauling machines 107, (v) a balance of the state-of-charge, state-of-health, and/or usage of the digging machines 103, loading machines 105, and/or hauling machines 107, (vi) fuel and/or charging operating cost, total operating cost or cost rate, material movement amount or rate, material movement cost rate, quality of output material, (vii) whether the power used exceeded available power and/or emplaced limits on power use, (viii) whether charging was scheduled to minimize down-time, e.g., during site off-hours or shift changes, etc. The reward function may include a factor related to the temporal alignment of assigned tasks 214, e.g., with a shift schedule at site 100, closures or downtime for equipment or a circuit 102, or the like. One or more factors, such as the foregoing factors, may be expressed in common units, e.g., in terms of impact on operating cost of site 100, or the like. Thus, optimizing the operation of site 100 via the reward function may result in a reduction and/or optimization of operating costs for site 100.

Any objective measure, such as may be determined manually and/or via a sensor or device of site 100, may form at least a portion of a basis for a factor of the reward function. As noted above, user 240 may adjust reward function 232, such as via user device 238, e.g., in order to select and/or prioritize factors for reward function 232 corresponding to various optimization objectives for site 100. Generally, reinforcement-learning model 228 would be trained or at least partially re-trained after modification to the reward function 232.

As used herein, "opportunistic charging" generally encompasses any charging that may occur while a digging machine 103, loading machine 105, and/or hauling machine 107 may otherwise be idle, e.g., while queuing, stopped due to an operating schedule at site 100, etc. or while static at a loading or dumping site. Digging machines 103, loading machines 105, and/or hauling machines 107 may also be dynamically charged in a manner that has a reduced impact on limiting the progression of a task or operation of the site. In one example, a digging machine 103, loading machine 105, and/or hauling machine 107 may be dynamically charged while traveling along a route via a dynamic charging device 150. In a further example, a digging machine 103, loading machine 105, and/or hauling machine 107 may include a regenerative braking system configured to generate power via braking, e.g., when machines 103, 105, and/or 107 are braking while descending an incline. A higher amount of opportunistic charging and/or dynamic charging generally corresponds to one or more of less idle time and/or more efficient operation for the digging machine 103, loading machine 105, and/or hauling machine 107.

As noted above, assignment engine 220 may include machine model or simulation 234. The machine model or simulation 234 may be usable, e.g., by the assignment engine 220, to generate training data for the reinforcement-learning model 228. Further, machine model or simulation 234 may be usable, e.g., via the assignment engine 220, to determine one or more characteristics of the state of digging machine 103, loading machine 105, and/or hauling machine 107. For example, some aspects of the state of a digging machine 103, loading machine 105, and/or hauling machine 107 may be observed or determined via a sensor, such as state-of-charge, position, current activities, and/or current weight of hauled material, etc. Using the machine model or simulation 234, such characteristics may be used to predict other characteristics that may not be easily directly observed, for example, how much charge a particular task assignment 214 may use for the digging machine 103, loading machine 105, and/or hauling machine 107, a time for the particular task to be completed, an effect of the particular task on the operational life of the digging machine 103, loading machine 105, and/or hauling machine 107 or the power storage device thereof, whether the digging machine 103, loading machine 105, and/or hauling machine 107 has sufficient charge to complete the particular task, etc.

The machine model or simulation 234 and/or aspects of the state of the digging machine 103, loading machine 105, and/or hauling machine 107 may be fed to the assignment engine 220 as further input to the reinforcement-learning model 228 and/or the assignment policy 230. Such characteristics, and in particular whether the digging machine 103, loading machine 105, and/or hauling machine 107 has sufficient charge to perform a task, may be used as initial constraints or conditions for one or more of the production planner 202, dispatcher 212, or assignment engine 220. Such characteristics may be compared with or modified by aspects of site 100, e.g., aspects of the particular task. For example, a digging machine 103, loading machine 105, and/or hauling machine 107 having insufficient charge to complete a task may nevertheless be listed as available for that task if there is availability for sufficient opportunistic charging during the task for the task to be completed.

The assignment engine 220 may generate and/or store a separate model and/or information usable to generate a respective model for each digging machine 103, loading machine 105, and/or hauling machine 107 of site 100. Aspects of the state of digging machines 103, loading machines 105, and/or hauling machines 107 may be tracked over time. Current state information for the digging machine 103, loading machine 105, and/or hauling machine 107 may be compared with historical information, e.g., to determine a deviation from expected performance, which may be used to trigger a maintenance operation or the like. Although discussed above with regard to the assignment engine 220, machine model or simulation 234 may operate in conjunction with and/or be stored on any suitable component, such as central controller 112, production planner 202, onboard a computing device of digging machine 103, loading machine 105, and/or hauling machine 107, etc.

As also noted above, assignment engine 220 may include one or more site model or simulation 236. The site model or simulation 236 may be implemented, e.g., by assignment engine 220, to generate training data for the reinforcement-learning model 228. Further, site model or simulation 236 may be implemented, e.g., via assignment engine 220, to determine one or more characteristics of the state of site 100. For example, some aspects of the state of site 100 may be observed or determined via a sensor, such as power consumption rates, occupancy of a site or charging station or device, etc. Using the site model or simulation 236, such characteristics and/or the state information from digging machine 103, loading machine 105, and/or hauling machine 107 may be used to predict other characteristics that may not be easily observed. For example, efficiency rates for various machines or equipment for production circuits 102 or site 100 as a whole, material movement amounts or rates, opportunistic charging rates, etc. The site model or simulation 236 and/or aspects of the state of site 100 may be fed to assignment engine 220 as further input to reinforcement-learning model 228 and/or assignment policy 230. Such characteristics, and in particular a power availability and occupancy for the one or more static charging stations 140 and/or dynamic charging device 150, may be used as initial constraints or conditions for one or more of production planner 202, dispatcher 212, or assignment engine 220. Such characteristics may be compared with or modified by aspects of digging machine 103, loading machine 105, and/or hauling machine 107 or of production planner 202, e.g., aspects of the available tasks.

Assignment engine 220 may generate and/or store a separate model and/or information usable to generate a respective model for each circuit 102 of site 100. Aspects of the state of site 100 may be tracked over time, e.g., to determine trends and/or make predictions about future performance. Current state information for site 100 may be compared with historical information, e.g., to determine a deviation from expected performance, which may be used to trigger a maintenance operation or the like. Although discussed above with regard to assignment engine 220, site model or simulation 236 may operate in conjunction with and/or be stored on any suitable component, such as central controller 112, production planner 202, onboard a computing device of the haul truck itself, etc.

Any suitable type of model or simulation may be used for machine model or simulation 234 or site model or simulation 236. One or more of machine model or simulation 234 or site model or simulation 236 may include a machine-learning model, e.g., that may be trained based on the historical operation of a digging machine 103, loading machine 105, and/or hauling machine 107 or site 100, and/or that may be tuned as additional state information becomes available.

Various components of central controller 112 may operate at different timing rates. For example, production planner 202 may be configured to determine available tasks for site 100 on a daily, hourly, or half-hour basis. Dispatcher 212 and/or assignment engine 220 may be configured to determine and/or modify task assignments 214 for the digging machine 103, loading machine 105, and/or hauling machine 107 every half-hour, every ten minutes, every minute, or in real-time or near real-time. Assignment engine 220 may be configured to tune or retrain the reinforcement-learning model 228 on a daily basis, continuously, in real-time or near real-time, or the like. Assignment engine 220 may be configured to assign a plurality of tasks to a digging machine 103, loading machine 105, and/or hauling machine 107, e.g. a set of tasks to be completed one after the other. Assignment engine 220 may be configured to re-evaluate tasks assigned to the digging machine 103, loading machine 105, and/or hauling machine 107, e.g., as successive tasks are completed and/or other circumstances change in site 100. Assignment engine 220 may assign tasks to the digging machine 103, loading machine 103, and/or hauling machine 107 that corresponds to the operation of site 100 for a predetermined period of time, such as a shift, a day, a week, etc., and may modify or tune such assignments on a periodic, near real-time, or real-time basis. Machine model or simulation 234 or site model or simulation 236 may be operated or tuned continuously, or on a periodic basis. It should be understood that the foregoing examples are illustrative only, and that any suitable timing for any of the foregoing elements may be used.

Although depicted as separate components in FIG. 2A, it should be understood that a component or portion of a component in central controller 112 may be integrated with or incorporated into one or more other components. Operations or aspects of one or more of the components discussed above may be distributed amongst one or more other components. Any suitable arrangement and/or integration of the various systems and devices of central controller 112 may be used.

In general, any process or operation discussed in this disclosure that is understood to be computer-implementable, such as the processes discussed below, may be performed by one or more processors of a computer system, such as any of the systems or devices of FIG. 2A, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 2A. One or more processors of a computer system may be included in a single computing device or distributed among a plurality of computing devices. A memory of the computer system may include the respective memory of each computing device of the plurality of computing devices.

FIGS. 2B, 2D, and 2F illustrate a scenario wherein assignment engine 220 monitors the state-of-charge and/or state-of-health of one or more batteries associated with work machines 103, 105, and/or 107 operating at site 100, according to aspects of the present disclosure. In one instance, digging machines 103, loading machines 105, and/or hauling machines 107 while executing the assigned tasks may draw energy from their respective batteries. The one or more sensors at site 100 and/or of machines 103, 105, and/or 107 (not shown) may track, in real-time or near real-time, conditions of the one or more batteries, e.g., state-of-charge of the batteries, temperature of the batteries, battery discharge rate, etc. The user interface of user device 238 (as depicted in FIG. 2) and/or dashboards 271, 273, and 275 of digging machines 103, loading machines 105, and hauling machines 107, respectively, may generate a presentation on the conditions of the one or more batteries.

In one instance, the tracked data is transmitted, in real-time or near real-time, by the sensors to assignment engine 220. The assignment engine 220 may process the sensor data to determine the charging requirements for the batteries of digging machines 103, loading machines 105, and/or hauling machines 107 to complete the assigned tasks. Assignment engine 220 may process the sensor data to determine the state-of-health of the batteries, e.g., a longer duration to fully charge the battery, a higher battery discharge rate, a lower energy retention rate, and/or faster temperature increment for similar tasks, may denote the state-of-health of the battery is deteriorating. Assignment engine 220 may generate a recommendation in a user interface of user device 238 and/or dashboard of digging machines 103, loading machines 105, and/or hauling machines 107. The recommendation may include instructions on balancing tasks and battery capacity, replacing the batteries, etc. In one instance, the user interface may employ various APIs or other function calls corresponding to the applications on user device 238, thus enabling the display of graphics primitives for generating the user interface elements.

Figure 2H:
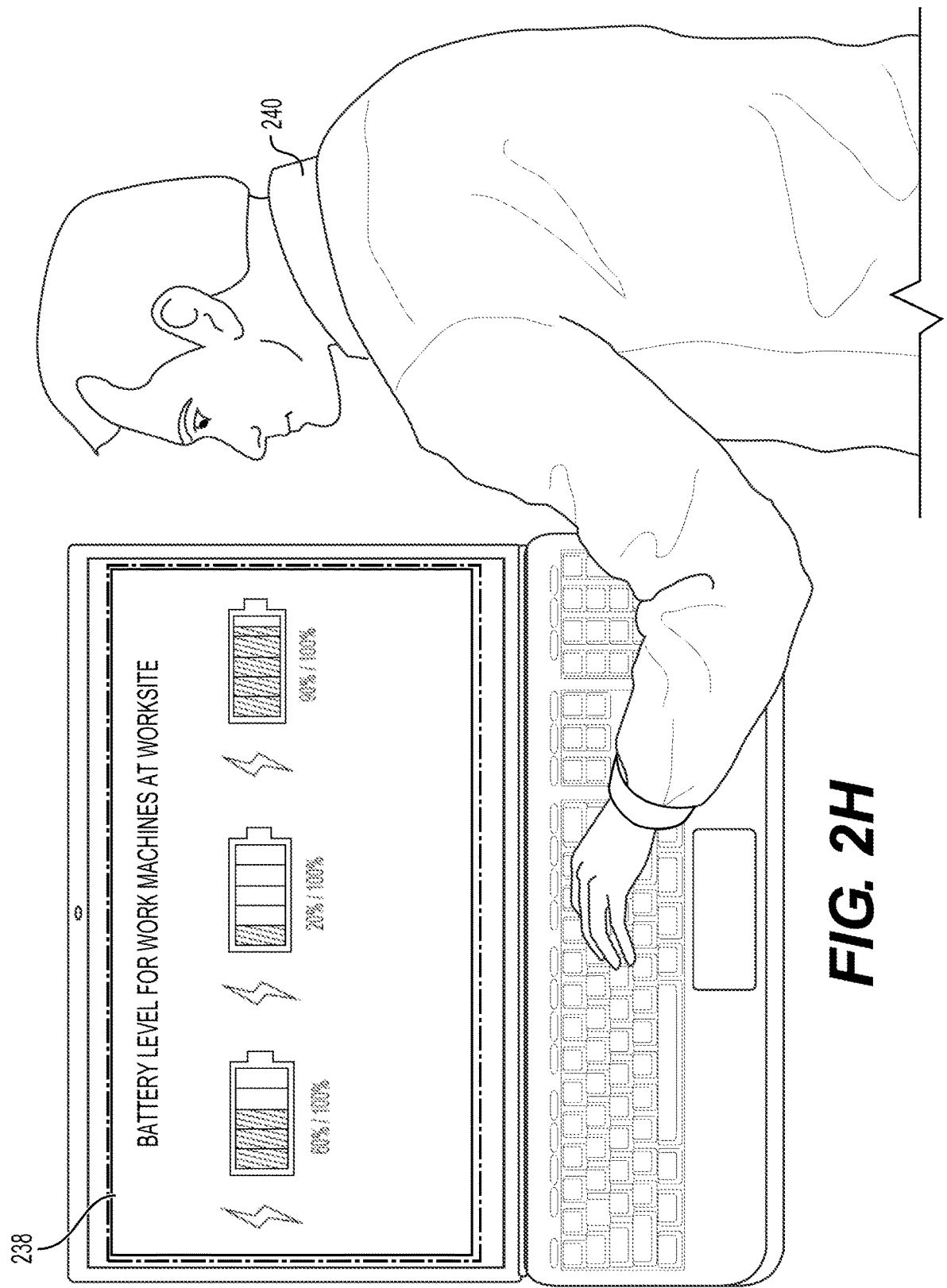
FIG. 2H illustrates a scenario for monitoring the condition of the batteries associated with work machines to generate a presentation in a user device associated with an operator, according to aspects of the disclosure.

FIG. 2H illustrates a scenario wherein an assignment engine monitors, in real-time or near real-time, the state-of-charge and/or state-of-health of one or more batteries to generate a presentation in a user interface of user device 238 associated with user 240, e.g., a site controller and/or a user associated with one or more of generating, training, or tuning the reinforcement-learning model 228, the reward function 232, and/or one or more of the simulations or models 234 or 236, according to aspects of the present disclosure. In one instance, digging machines 103, loading machines 105, and/or hauling machines 107 may be operator-driven, such that the state-of-charge and/or state-of-health of the batteries are received at user device 238. The user 240 may make a decision based on the received sensor data, e.g., instruct digging machines 103, loading machines 105, and/or hauling machines 107 to travel to a charging station, generate a speed plan to travel and/or perform a task at a set speed, etc. In one instance, the authority of user 240 may be based, at least in part, on skill level, experience level, and/or authorization level.

Figure 3:
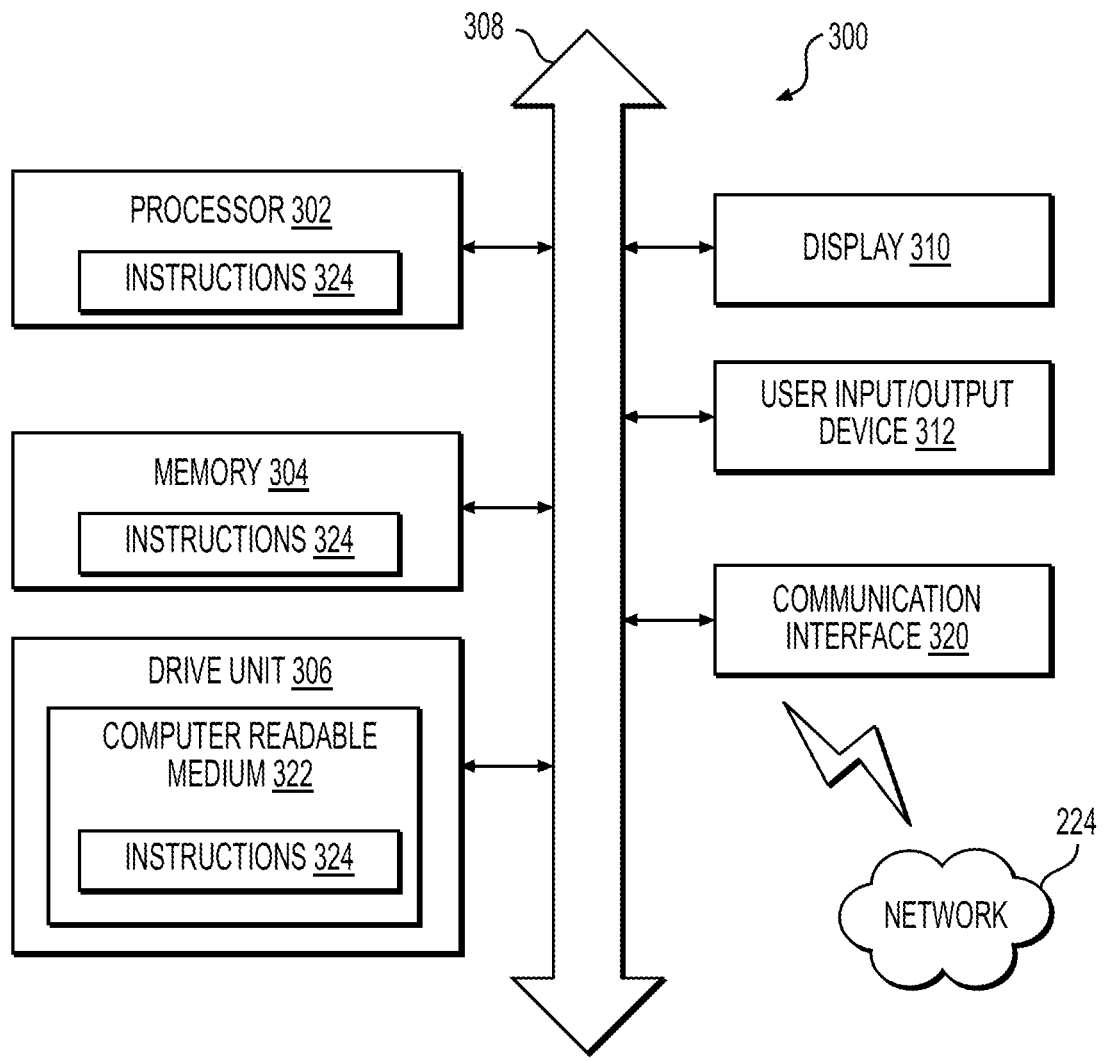
FIG. 3 depicts an example of a computing device, according to aspects of the disclosure.

FIG. 3 is a simplified functional block diagram of a computer 300 that may be configured as a device for executing the methods of FIGS. 4A-4D, according to exemplary embodiments of the present disclosure. For example, computer 300 may be configured as central controller 112 and/or another system according to this disclosure. Any of the systems herein may be computer 300 including, for example, data communication interface 320 for packet data communication. Computer 300 also may include a central processing unit ("CPU") 302, in the form of one or more processors, for executing program instructions. Computer 300 may include internal communication bus 308, and storage unit 306 (such as ROM, HDD, SDD, etc.) that may store data on computer readable medium 322, although computer 300 may receive programming and data via network communications. Computer 300 may also have memory 304 (such as RAM) storing instructions 324 for executing techniques presented herein, although instructions 324 may be stored temporarily or permanently within other modules of computer 300 (e.g., processor 302 and/or computer readable medium 322). Computer 300 also may include input and output ports 312 and/or display 310 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

INDUSTRIAL APPLICABILITY

An assignment engine of the present disclosure may be configured to optimize the assignment of tasks for a wide variety of machines or equipment that collectively operate on a worksite for various activities, such as construction, digging, loading, hauling, mining, farming, material sorting, logistics, packing, etc. The assignment of tasks may be optimized to achieve various objectives, e.g., utilization or balance of charge amongst the plurality of vehicles, efficiency of the plurality of vehicles, regulate or reduce total operating cost, improve total production, or improve production rate(s), etc. In one instance, operations of such a wide variety of machines or equipment may be optimized to attain the objectives in an autonomous or semi-autonomous manner.

The assignment engine may account for the historical performance of one or more vehicles while determining whether a vehicle has sufficient capacity to perform a task. In one instance, the assignment engine may assign tasks to digging machines 103, loading machines 105, and/or hauling machines 107 having sufficient operational capacity to complete the assigned tasks. The assignment engine may also account for various conditions, e.g., a change in weather conditions, vehicle or equipment conditions, material quality, etc., and their impact on the performance of the vehicles. In one instance, the assignment engine may facilitate opportunistic charging of the vehicles, reduce vehicle idle time, balance usage and workload across the vehicles, regulate or reduce total power consumption by the equipment in site 100.

Further aspects of a reinforcement-learning model and/or how it may be utilized to assign tasks to a plurality of vehicles in a worksite are discussed in further detail in the methods below. In the following methods, various acts may be described as performed or executed by a component from FIG. 1 or 2 A-H, such as central controller 112, assignment engine 220, user device 238, or the like. However, it should be understood that any suitable component or device may execute instructions or perform acts including the acts discussed below. An act performed by a device may be considered to be performed by a processor, actuator, or the like associated with that device. Further, it should be understood that various steps may be added, omitted, and/or rearranged in any suitable manner. In an example, the computer system executing assignment engine 220, be it central controller 112 or another system such as a system for training reinforcement-learning model 228, may be referred to interchangeably as dispatch system 200 or as assignment engine system 200.

Figure 4A:
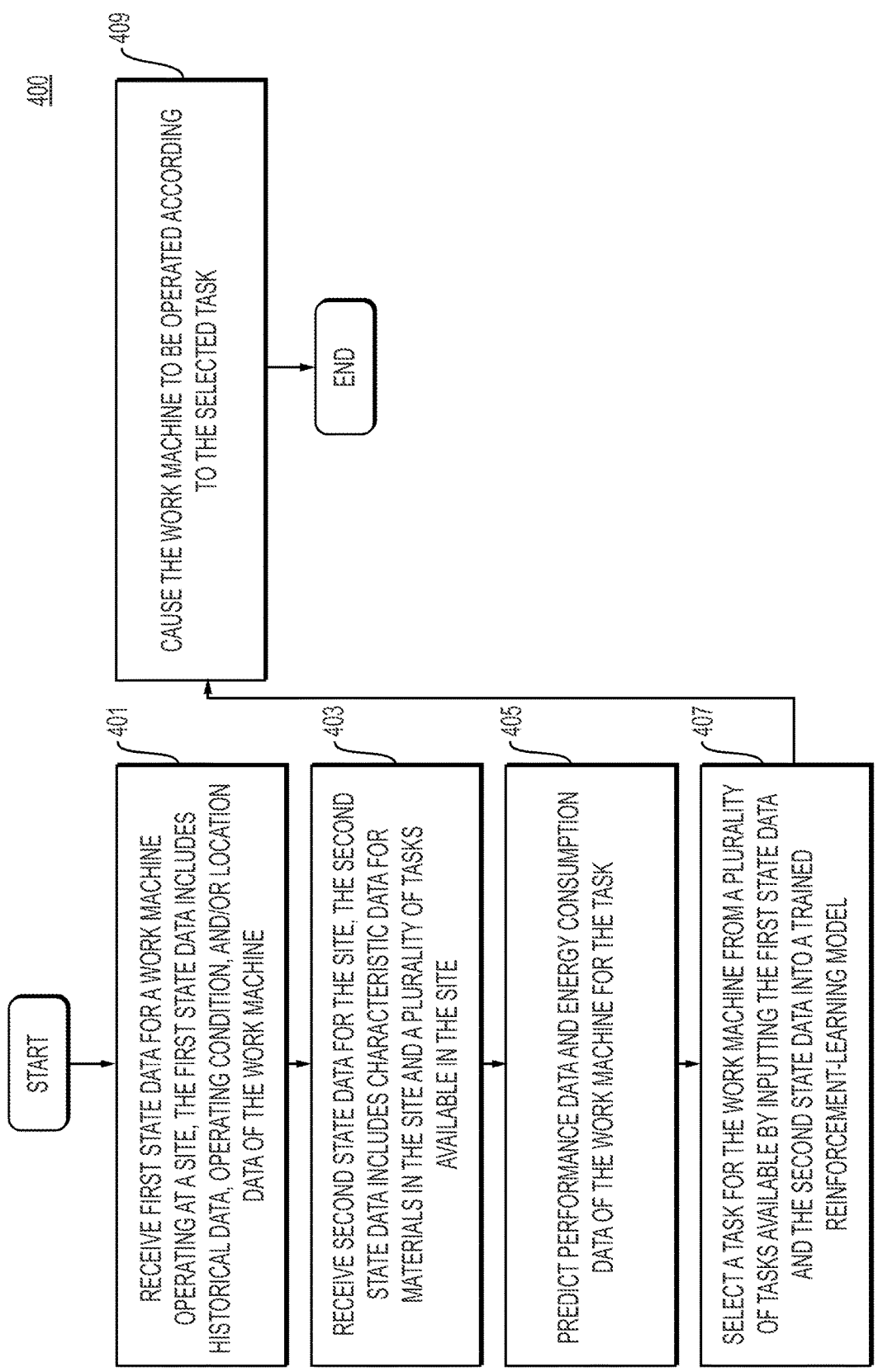
FIG. 4A depicts a flowchart of an exemplary method for using a reinforcement-learning model to manage task assignments for a plurality of vehicles operating a worksite, according to aspects of the disclosure.

FIG. 4A illustrates an exemplary process 400 for using a reinforcement-learning model to the optimize operation of a worksite, such as in the various examples discussed above. In various embodiments, assignment engine 220 of an assignment engine system may perform one or more portions of process 400 and may be implemented in, for instance, a chip set including a processor and a memory as shown in FIG. 3. The assignment engine 220 may be a dispatcher 212 operating on a central controller 112 for site 100. The assignment engine 220 may be on another system, e.g., user device 238, for training reinforcement-learning model 228 of assignment engine 220. As such, assignment engine 220 may provide means for accomplishing various parts of process 400, as well as means for accomplishing embodiments of other processes described herein. Although process 400 is illustrated and described as a sequence of steps, it is contemplated that various embodiments of process 400 may be performed in any order or combination and need not include all of the illustrated steps.

At step 401, assignment engine 220 may receive first state data 226 for a work machine, e.g., digging machine 103, loading machine 105, and/or hauling machine 107, operating at a site, e.g., site 100. In one instance, the first state data 226 includes historical data of the work machine, one or more operating conditions of at least one component of the work machine, real-time or near real-time location data of the work machine, or a combination thereof. The operating condition of at least one component may include the operating condition of a battery and/or an operating condition of a ground engaging implement of the work machine to engage a surface of the materials in the site. In one instance, the historical data may include past performance data, productivity data, power consumption data, state-of-health data, travel speed data, temperature data, operating cost data, or a combination thereof associated with the work machine. In one instance, the operating condition includes usage data, maintenance data, durability data, measurement data, wear data, or a combination thereof associated with one or more components of the work machine.

At step 403, assignment engine 220 may receive second state data 206 for the site 100. In one instance, the second state data 206 may include characteristic data for materials in the site and a plurality of tasks available at the site. The plurality of tasks may be associated with the manipulation of the materials in the site, and the characteristic data is indicative of energy consumption associated with the manipulation of the materials by the work machine. The second state data may further include a road condition associated with the site, a weather condition associated with the site, state information on static charging stations, state information on dynamic charging stations, or a combination thereof. In one instance, the characteristic data for the materials in the site includes material type information, material density information, material texture information, material hardness information, moisture content of the material, or a combination thereof.

At step 405, trained reinforcement-learning model 228 of assignment engine 220 may predict performance data and energy consumption data of the work machine for a task. In one instance, trained reinforcement-learning model 228 may process the first state data and the second state data to predict (i) the amount of charge required for the digging machine 103, loading machine 105, and/or hauling machine 107 to complete the task, (ii) total duration required for the digging machine 103, loading machine 105, and/or hauling machine 107 to complete the task, (iii) operational life of digging machine 103, loading machine 105, and/or hauling machine 107, (iv) the operational cost associated with completing the task by the digging machine 103, loading machine 105, and/or hauling machine 107, etc.

At step 407, assignment engine 220 may select a task for assignment to the work machine from the plurality of tasks available in site 100 by inputting the first state data 226 and the second state data 206 into trained reinforcement-learning model 228. Trained reinforcement-learning model 228 has been trained based on training first state data and training second state data, and may include a task assignment policy 230 and a reward function 232. For example, the reinforcement-learning model 228 may apply the policy to the input first and second training state data to cause a task to be assigned to digging machines 103, loading machines 105, and/or hauling machines 107. The model 228 may include a relational model or neural network, or the like. In one instance, the task assignment includes an excavating assignment, a loading assignment, a hauling assignment, a clean-up assignment, a road grading assignment, a charging assignment, or any other suitable assignment or a combination thereof. Assignment engine 220 may also provide route instructions, speed instructions, or a combination thereof to the work machine to complete the task assignment. An exemplary task assignment for digging machines 103, loading machines 105, and/or hauling machines 107 may include, for example, travel to a location of the task at a particular speed, perform the assigned task at a specified speed, travel to static charging station 140 and charge for a predetermined period of time or until a state-of-charge reaches a particular level, utilize a dynamic charging device 150 while traveling to the location of the task, etc. Such speed instructions may result in reduced queuing, more efficient occupancy of a charging station 140 or charging device 150, reduced overlap in travel paths and/or interactions between digging machines 103, loading machines 105, and/or hauling machines 107 at intersections.

At step 409, assignment engine 220 may cause digging machines 103, loading machines 105, and/or hauling machines 107 to be operated according to the task assignment. For example, assignment engine 220, e.g., via the central controller 112, may transmit one or more instructions to digging machines 103, loading machines 105, and/or hauling machines 107 and/or a computing device associated with these machines. In one instance, the digging machines 103, loading machines 105, and/or hauling machines 107 may be autonomous, such that receiving the instructions causes these machines to execute the instructions in furtherance of the at least one task assignment. In one instance, digging machines 103, loading machines 105, and/or hauling machines 107 may be operator-driven, such that the instructions are received at a computing device associated with an operator. Instructions received at a computing device associated with an operator may be received in conjunction with instructions for digging machines 103, loading machines 105, and/or hauling machines 107. In one instance, assignment engine 220 may process operator-specific data, e.g., skill or experience level, authorization level, work history data, machine usage history, etc. for operator-driven machines 103, 105, and/or 107. The task assignment to operator-driven machines 103, 105, and/or 107 may further be based, at least in part, on operator-specific data. In one instance, the one or more instructions include a speed plan to automatically set a speed of travel and/or speed of performing a task, a location plan to automatically set the destination of travel, etc. In one instance, assignment engine 220 may monitor, in real-time or near real-time, a state-of-health of the various components e.g., bucket, digging teeth, engines, blades, etc., of work machines 103, 105, and/or 107 to determine whether work machines 103, 105, and/or 107 may efficiently perform the assigned task. The digging machines 103, loading machines 105, and/or hauling machines 107 may be subjected to harsh conditions which may put extreme wear on their components. Any unanticipated component failure may result in a variety of problems, e.g., the machine may be inoperable until it is repaired, the stalled machine may be in a location that may block passageways of other working machines, negatively impact the work plan, etc. Accordingly, assignment engine 220 may process, in real-time or near real-time, age data, usage data, maintenance data, repair history, performance data, and efficiency data of the various components of digging machines 103, loading machines 105, and/or hauling machines 107. For example, assignment engine 220 may evaluate the wear percentage on the bucket and the digging teeth of a digging machine 103 and its impact on the performance and efficiency. Assignment engine 220 may generate, in real-time or near real-time, a notification to replace the bucket and the digging teeth or use different digging machines 103 upon determining the state-of-health of the components is below a threshold level.

Figure 4B:
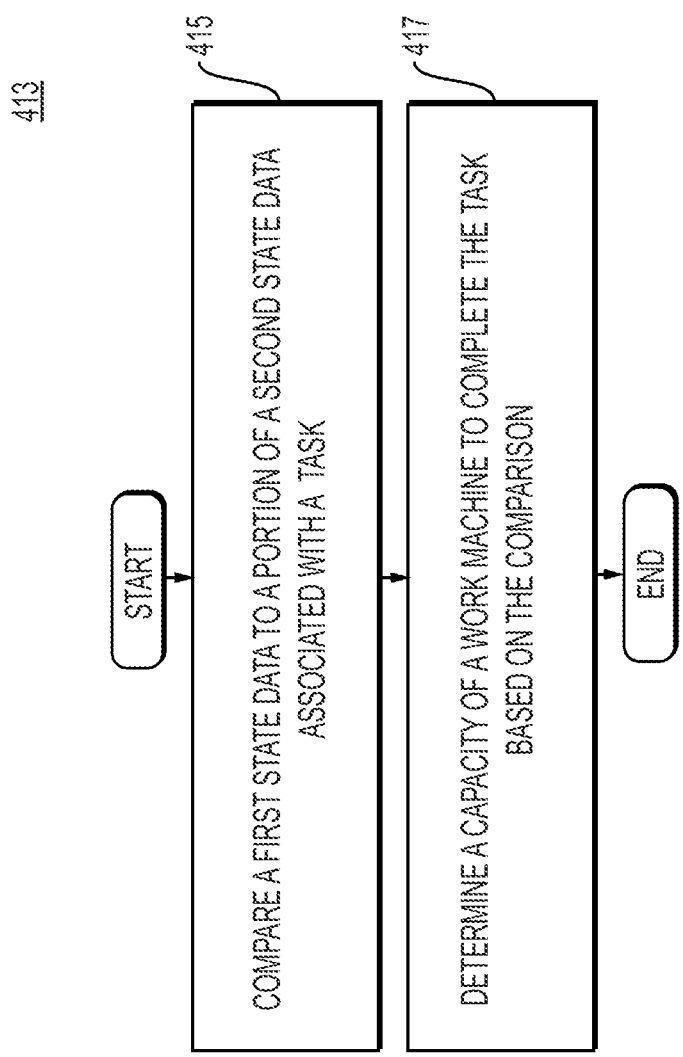
FIG. 4B depicts a flowchart of an exemplary method for determining a capacity of a work machine to complete a task, according to aspects of the disclosure.

FIG. 4B illustrates an exemplary process for determining a capacity of a work machine to complete a task, such as in the various examples discussed above. In various embodiments, assignment engine 220, e.g., one or more of model 234, model 236, and/or model 228, of an assignment engine system may perform one or more portions of process 413 and may be implemented in, for instance, a chip set including a processor and a memory as shown in FIG. 3. As such, assignment engine 220 may provide means for accomplishing various parts of process 413, as well as means for accomplishing embodiments of other processes described herein. Although process 413 is illustrated and described as a sequence of steps, it is contemplated that various embodiments of process 413 may be performed in any order or combination and need not include all of the illustrated steps.

At step 415, assignment engine 220 may compare the first state data to at least a portion of the second state data associated with the task. In one instance, one or more operating conditions of at least one component of work machines 103, 105, and/or 107, e.g., state-of-heath of a battery and wear/tear on a ground engaging implement, may be compared to characteristic data for materials in the site. In one instance, historical data, e.g., past performance data, of work machines 103, 105, and/or 107 may be compared to the plurality of tasks available at the site. In one instance, real-time or near real-time location data of work machines 103, 105, and/or 107 may be compared to the location of the plurality of tasks available at the site. In one instance, productivity data and power consumption data of work machines 103, 105, and/or 107 while performing a particular task may be compared to the plurality of tasks available at the site.

At step 417, assignment engine 220 may determine the capacity of the work machine to complete the task based, at least in part, on the comparison. In one instance, assignment engine 220 may determine the productivity data of work machines 103, 105, and/or 107 is too low to timely complete a particular task based on historical performance data. In one instance, assignment engine 220 may determine work machines 103, 105, and/or 107 may not have the capacity to timely complete a particular task based on the state-of-heath of the battery and wear/tear on a ground engaging implement. In one instance, assignment engine 220 may determine power consumption data of work machines 103, 105, and/or 107 is too high to timely complete a particular task as it may require frequent charging during operation. In one instance, assignment engine 220 may determine the real-time location of work machines 103, 105, and/or 107 is too far to timely arrive at the location of the task and complete it in a timely fashion. In one instance, assignment engine 220 may determine the weather condition at site 100 is too harsh, e.g., heavy rain, heavy snow, etc., for the work machines 103, 105, and/or 107 to efficiently and timely complete the assigned task.

Figure 4C:
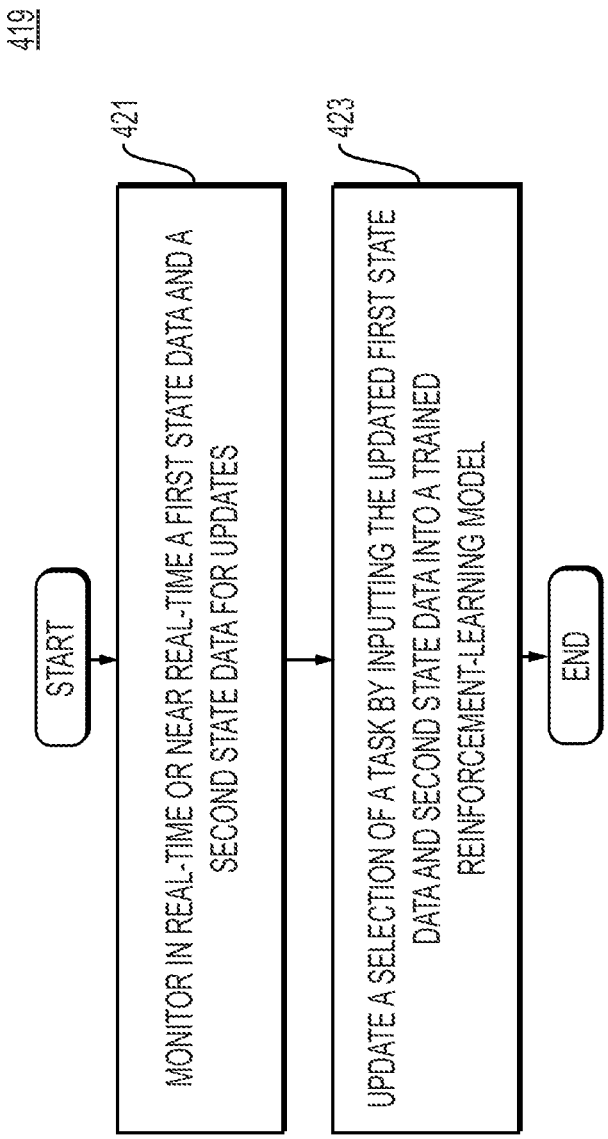
FIG. 4C depicts a flowchart of an exemplary method for updating the task assignment for work machines, according to aspects of the disclosure.

FIG. 4C illustrates an exemplary process for updating the task assignment to the one or more work machines. In various embodiments, assignment engine 220 of an assignment engine system may perform one or more portions of process 419 and may be implemented in, for instance, a chip set including a processor and a memory as shown in FIG. 3. As such, assignment engine 220 may provide means for accomplishing various parts of process 419, as well as means for accomplishing embodiments of other processes described herein. Although process 419 is illustrated and described as a sequence of steps, it is contemplated that various embodiments of process 419 may be performed in any order or combination and need not include all of the illustrated steps.

At step 421, assignment engine 220 may monitor in real-time or near real-time the first state data and the second state data for updates. In one instance, assignment engine 220 may monitor, in real-time, a state-of-charge of the battery of work machines 103, 105, and/or 107 to determine whether the level of charge is below a minimum charge threshold. Assignment engine 220 may enquire, in real-time, the availability of a charger at proximate static or dynamic charging stations to charge work machines 103, 105, and/or 107. In one instance, assignment engine 220 may monitor, in real-time, a state-of-health of the various components of work machines 103, 105, and/or 107, e.g., battery, bucket, digging teeth, blades, etc., to determine whether work machines 103, 105, and/or 107 may efficiently perform the assigned task. Assignment engine 220 may generate, in real-time, a notification to replace the components or use a different work machines 103, 105, and/or 107 upon determining the state-of-health of one or more of the various components is below a threshold level.

At step 423, assignment engine 220 may update a selection of at least one task by inputting the updated first state data and second state data into the trained reinforcement-learning model. In one instance, assignment engine 220 may input, in real-time, the updated first state data and second state data into trained reinforcement-learning model 228, whereupon the trained reinforcement-learning model 228 may update the selection of work machines 103, 105, and/or 107.

FIG. 4D illustrates an exemplary process for training the reinforcement learning model 228, e.g., by updating a task assignment policy based on a scoring mechanism, such as in the various examples discussed above. As noted above, the policy may be initialized via a suitable technique, e.g., a random or pseudo random approach, based on simulated data and/or training data, or the like. In various embodiments, assignment engine 220 of an assignment engine system may perform one or more portions of process 425 and may be implemented in, for instance, a chip set including a processor and a memory as shown in FIG. 3. As such, assignment engine 220 may provide means for accomplishing various parts of process 425, as well as means for accomplishing embodiments of other processes described herein. Although process 425 is illustrated and described as a sequence of steps, it is contemplated that various embodiments of process 425 may be performed in any order or combination and need not include all of the illustrated steps.

At step 427, assignment engine 220 may receive the first state data and the second state data after the completion of the assigned task. In one instance, assignment engine 220 may receive the first state data and second state data, as it is available, continuously, and/or in real-time or near real-time. Assignment engine 220 may receive the first state data and second state data from a period of time after the assigned task is completed, after each respective task is completed, or after a batch of tasks is completed. Assignment engine 220 may receive and/or access a history of task assignments for the one or more work machines. In some instances, the history may include information regarding portions of the policy, e.g., weights and/or biases, that were associated with each assignment.

At step 429, assignment engine 220 may generate a score using the reward function based on the first state data and the second state data. In one instance, the reward function may include a rubric of criteria, a weighted scoring function, or the like. Various criteria or objectives for the reward function may be interrelated, e.g., via one or more sub-functions. The reward function may include an algorithm or the like based on one or more objectives. The reward function may be predetermined. At least a portion of the reward function may be entered or selected manually, e.g., by a user 240 via a user device 238. The reward function may account for the total cost for operating the site, total material processed by the site, power consumption of the site, balance of charge across the plurality of vehicles operating on the site, state of charge of the plurality of vehicles operating on the site, capacity for the at least vehicle to complete the at least one task assignment, or the like.

At step 431, assignment engine 220 may update the task assignment policy based, at least in part, on the generated score. In one instance, assignment engine 220 may use one or more machine-learning techniques to feed the generated score back into the task assignment policy, e.g., such that portions of the policy resulting in a higher score are reinforced, or such that portion of the policy resulting in a lower score is de-emphasized. For example, for a task assignment that led to a relatively higher score or contributed to an increased score, the assignment engine 220 may increase the weights and/or biases associated with that task assignment. Conversely, for a task assignment that led to a relatively lower score or that contributed to a decreased score, the assignment engine 220 may decrease the weights and/or biases associated with that task assignment. Optionally, one or more of steps 427-431 may be iterated, e.g., to further adjust the task assignment policy. The method may be iterated until one or more of: the score meets a pre-determined score threshold, a rate of change of the score across iterations is less than a pre-determined threshold, a pre-determined number of iterations have occurred, or a pre-determined time period has passed.

It should be understood that embodiments in this disclosure are exemplary only, and that other embodiments may include various combinations of features from other embodiments, as well as additional or fewer features. It will be apparent to those skilled in the art that various modifications and variations can be made to the disclosed system without departing from the scope of the disclosure. For example, while some of the embodiments above pertain to GHG free vehicles or battery-operated electric machines, any suitable vehicle or machine that may be assigned tasks may be used. Further, while some of the embodiments above pertain to construction, excavation, loading, and/or material movement for a worksite, any other suitable activities may be used. In addition, while some of the embodiments above pertain to digging machines 103, loading machines 105, and/or hauling machines 107, any suitable vehicle and/or stationary machine may be used.

What is claimed is:

1. A computer-implemented method for managing task assignments for a plurality of work machines at a site, comprising:

receiving, via one or more processors of an assignment engine system, first state data for at least one work machine operating at the site, wherein the first state data includes historical data of the at least one work machine, one or more operating condition of at least one component of the at least one work machine, real-time or near real-time location data of the at least work machine, or a combination thereof;

receiving, via the one or more processors of the assignment engine system, second state data for the site, wherein the second state data includes characteristic data for material in the site and a plurality of tasks available at the site, wherein the plurality of tasks are associated with manipulation of the material in the site, and the characteristic data is indicative of energy consumption associated with the manipulation of the material by the at least one work machine;

predict performance data and energy consumption data of the at least one work machine for a task; and selecting at least one task for the at least one work machine from the plurality of tasks available by inputting, via the one or more processors of the assignment engine system, the first state data and the second state data into a trained reinforcement-learning model, wherein the trained reinforcement-learning model has been trained, based on training first state data and training second state data, to:

learn an assignment policy that optimizes a reward function for the site, such that the trained reinforcement-learning model is configured to apply the learned assignment policy to the first state data, the second state data, and one or more predictions of the performance data and the energy consumption data of the at least one work machine to select the at least one task for the at least one work machine from the plurality of tasks available at the site; and causing, via the one or more processors of the assignment engine system, the at least one work machine to be operated according to the at least one selected task, wherein the at least one task assignment includes an excavating assignment, a loading assignment, a hauling assignment, a clean-up assignment, a road grading assignment, a charging assignment, or a combination thereof, and wherein route instructions, speed instructions, or a combination thereof is provided to the at least one work machine to complete the at least one task assignment.

2. The computer-implemented method of claim 1, wherein the first state data further includes the operating condition of a battery of the at least one work machine and an operating condition of a ground engaging implement of the at least one work machine to engage a surface of the material in the site.

3. The computer-implemented method of claim 2, wherein predicting the performance data and the energy consumption data of the at least one work machine for a task includes:

comparing, via one or more models of the assignment engine system, the first state data to at least a portion of the second state data associated with the task; and determining, via one or more models of the assignment engine system, a capacity of the at least one work machine to complete the task based, at least in part, on the comparison.

4. The computer-implemented method of claim 2, wherein the first state data further includes a state-of-charge of the battery, and wherein the second state data further includes availability of a charger at a static or a dynamic charging station, the method includes:

monitoring, via the one or more processors of the assignment engine system, in real-time or near real-time the first state data and the second state data for updates; and updating a selection of the at least one task by inputting the updated first state data and second state data into the trained reinforcement-learning model.

5. The computer-implemented method of claim 1, wherein the historical data includes past performance data, productivity data, power consumption data, state-of-health data, travel speed data, temperature data, operating cost data, or a combination thereof associated with the at least one work machine.

6. The computer-implemented method of claim 1, wherein the operating condition includes usage data, maintenance data, durability data, measurement data, wear data, or a combination thereof associated with the at least one component of the at least one work machine.

7. The computer-implemented method of claim 1, wherein the second state data further includes a road condition associated with the site, a weather condition associated with the site, state information on static charging stations, state information on dynamic charging stations, or a combination thereof.

8. The computer-implemented method of claim 1, wherein the characteristic data for the material in the site includes material type information, material density information, material texture information, material hardness information, a moisture content of material, or a combination thereof.

9. The computer-implemented method of claim 1, wherein the reward function accounts for balance of charge across the plurality of work machines, state-of-charge of the plurality of work machines, an amount of opportunistic charging for the plurality of work machines, a total operating cost of the site, total material processed by the site, power consumption of the site, or a combination thereof.

10. The computer-implemented method of claim 1, wherein the at least one work machine is an autonomous machine, a semi-autonomous machine, or a combination thereof.

11. A computer-implemented method for training a machine-learning model for managing task assignments for a plurality of work machines at a site, comprising:

receiving, via one or more processors of an assignment engine system, first state data for at least one work machine operating at the site, wherein the first state data includes historical data of the at least one work machine, one or more operating condition of at least one component of the at least one work machine, real-time or near real-time location data of the at least work machine, or a combination thereof;

receiving, via the one or more processors of the assignment engine system, second state data for the site, wherein the second state data includes characteristic data for material in the site and a plurality of tasks available at the site, wherein the plurality of tasks are associated with manipulation of the material in the site, and the characteristic data is indicative of energy consumption associated with the manipulation of the material by the at least one work machine;

assigning, via the one or more processors of the assignment engine system, at least one task from the plurality of tasks to the at least one work machine by inputting the first state data and the second state data into a trained reinforcement-learning model that includes a task assignment policy and a reward function;

causing, via the one or more processors of the assignment engine system, the at least one work machine to be operated according to the at least one task assignment;

receiving, via the one or more processors of the assignment engine system, further first state data and further second state data after a completion of the at least one task assignment;

generating, via the one or more processors of the assignment engine system, a score using the reward function based on the further first state data and the further second state data; and updating the task assignment policy based, at least in part, on the generated score, wherein the method is iterated until one or more of: the score meets a pre-determined score threshold; a rate of change of the score across iterations is less than a pre-determined threshold; a pre-determined number of iterations have occurred; or a pre-determined time period has passed.

12. The computer-implemented method of claim 11, wherein the first state data further includes the operating condition of a battery of the at least one work machine and an operating condition of a ground engaging implement of the at least one work machine to engage a surface of the material in the site.

13. The computer-implemented method of claim 11, wherein the historical data includes past performance data, productivity data, power consumption data, state-of-charge data, state-of-health data, travel speed data, temperature data, operating cost data, or a combination thereof associated with the at least one work machine.

14. The computer-implemented method of claim 11, wherein the operating condition includes usage data, maintenance data, durability data, measurement data, wear data, or a combination thereof associated with the at least one component of the at least one work machine.

15. The computer-implemented method of claim 11, wherein the second state data further includes a road condition associated with the site, a weather condition associated with the site, state information on static charging stations, state information on dynamic charging stations, or a combination thereof.

16. A system for operating a plurality of work machines at a site, comprising:
the plurality of work machines that are green-house-gas free and autonomous;
a central controller, including:
at least one memory storing instructions; and
at least one processor operatively connected to the at least one memory and configured to execute the instructions to implement:
a production planner configured to determine at least one task assignment for the plurality of work machines at the site, wherein the at least one task assignment includes an excavating assignment, a loading assignment, a hauling assignment, a clean-up assignment, a road grading assignment, a charging assignment, or a combination thereof, and wherein route instructions, speed instructions, or a combination thereof is provided to the at least one work machine to complete the at least one task assignment; and
a dispatcher configured to assign the at least one task assignment to at least one work machine, the dispatcher having:
a trained reinforcement-learning model that has been trained, based on training first state data that includes historical data of the at least one work machine, one or more operating condition of at least one component of the at least one work machine, real-time or near real-time location data of the at least work machine, or a combination thereof and training second state data that includes characteristic data for material in the site indicative of energy consumption associated with manipulation of the material by the at least one work machine and a plurality of available tasks that are associated with the manipulation of the material in the site, to learn an assignment policy that optimizes a reward function for the site, such that the trained reinforcement-learning model is configured to apply the learned assignment policy to input first state data for the work machines and second state data for the site to select at least one task to assign to the work machines; and
an assignment engine configured to perform operations, including:
receiving the first state data;
receiving the second state data;
assigning the at least one task to the at least one work machine by inputting the first state data and the second state data into the trained reinforcement-learning model: and
causing the at least one work machine to be operated according to the at least one task assignment.

17. The system of claim 16, wherein the first state data further includes the operating condition of a battery of the at least one work machine and an operating condition of a ground engaging implement of the at least one work machine to engage a surface of the material in the site.

18. The system of claim 17, wherein predicting performance data and energy consumption data of the at least one work machine for a task includes:
comparing, via one or more models of the assignment engine system, the first state data to at least a portion of the second state data associated with the task; and
determining, via one or more models of the assignment engine system, a capacity of the at least one work machine to complete the task based, at least in part, on the comparison.

19. The system of claim 17, wherein the first state data further includes a state-of-charge of the battery, and wherein the second state data further includes availability of a charger at a static or a dynamic charging station, the operations further comprising:
monitoring, via the one or more processors of the assignment engine system, in real-time or near real-time the first state data and the second state data for updates; and
updating a selection of the at least one task by inputting the updated first state data and second state data into the trained reinforcement-learning model.

20. The system of claim 16, wherein the historical data includes past performance data, productivity data, power consumption data, state-of-health data, travel speed data, temperature data, operating cost data, or a combination thereof associated with the at least one work machine.

21. The system of claim 16, wherein the operating condition includes usage data, maintenance data, durability data, measurement data, wear data, or a combination thereof associated with the at least one component of the at least one work machine.

22. The system of claim 16, wherein the second state data further includes a road condition associated with the site, a weather condition associated with the site, state information on static charging stations, state information on dynamic charging stations, or a combination thereof.

23. The system of claim 16, wherein the characteristic data for the material in the site includes material type information, material density information, material texture information, material hardness information, a moisture content of material, or a combination thereof.

24. The system of claim 16, wherein the reward function accounts for balance of charge across the plurality of work machines, state-of-charge of the plurality of work machines, an amount of opportunistic charging for the plurality of work machines, a total operating cost of the site, total material processed by the site, power consumption of the site, or a combination thereof.

* * * * *